(12) United States Patent
Chen et al.

(10) Patent No.: US 8,756,544 B2
(45) Date of Patent: *Jun. 17, 2014

(54) METHOD FOR INSERTING CHARACTERISTIC EXTRACTOR

(71) Applicant: Industrial Technology Research Institute, Hsinchu (TW)

(72) Inventors: Yi-Siou Chen, Taoyuan County (TW); Tung-Hua Yeh, Taichung (TW); Jen-Chieh Yeh, Hsinchu (TW); Wen-Tsan Hsieh, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/851,094

(22) Filed: Mar. 26, 2013

(65) Prior Publication Data

US 2013/0212546 A1     Aug. 15, 2013

Related U.S. Application Data

(63) Continuation-in-part of application No. 13/041,443, filed on Mar. 7, 2011, now Pat. No. 8,510,694.

(30) Foreign Application Priority Data

Dec. 6, 2010 (TW) ................................ 99142387 A

(51) Int. Cl.
    *G06F 17/50* (2006.01)
(52) U.S. Cl.
    CPC .......... *G06F 17/5022* (2013.01); *G06F 17/505* (2013.01)

USPC .......... 716/106; 716/111; 716/103; 716/104; 703/16; 703/17; 703/20

(58) Field of Classification Search
CPC .......................... G06F 17/5022; G06F 17/505
USPC ......... 716/106, 111, 103, 104; 703/16, 17, 20
See application file for complete search history.

(56) References Cited

U.S. PATENT DOCUMENTS

| 5,481,484 A | 1/1996 | Ogawa et al. |
| 6,625,781 B2 | 9/2003 | Roethig et al. |

(Continued)

FOREIGN PATENT DOCUMENTS

| EP | 1835426 A1 | 9/2007 |
| TW | 200620116 | 6/2006 |
| WO | 2007066319 A1 | 6/2007 |

OTHER PUBLICATIONS

Bansal et al., "Power Monitors: A Framework for System-Level Power Estimation Using Heterogeneous Power Models," 18th International Conference on VLSI Design, Jan. 3-7, 2005, pp. 579-585.

(Continued)

*Primary Examiner* — Phallaka Kik
(74) *Attorney, Agent, or Firm* — Jianq Chyun IP Office

(57) ABSTRACT

A method for inserting characteristic extractor is provided. The method includes parsing a transaction level model (TLM) of an electronic device of a target system to find out at least one target point of an operation status of the electronic device; and inserting at least one characteristic extractor into the at least one target point.

20 Claims, 19 Drawing Sheets

(56) References Cited

U.S. PATENT DOCUMENTS

| | | |
|---|---|---|
| 6,735,744 B2 | 5/2004 | Raghunathan et al. |
| 6,865,526 B1 | 3/2005 | Henkel et al. |
| 7,051,300 B1 | 5/2006 | Shen et al. |
| 7,143,368 B1 | 11/2006 | Plofsky et al. |
| 7,370,299 B2 | 5/2008 | Huang et al. |
| 7,571,398 B2 * | 8/2009 | Bormann et al. ............. 716/106 |
| 7,725,848 B2 | 5/2010 | Nebel et al. |
| 8,166,430 B2 * | 4/2012 | Bormann et al. ............. 716/106 |
| 8,510,694 B2 * | 8/2013 | Hsieh et al. ................... 716/109 |
| 2002/0004927 A1 | 1/2002 | Takahashi et al. |
| 2005/0204316 A1 | 9/2005 | Nebel et al. |
| 2005/0223344 A1 | 10/2005 | Sato et al. |
| 2006/0080076 A1 | 4/2006 | Lahiri et al. |
| 2006/0212493 A1 * | 9/2006 | Aronoff et al. ............... 707/202 |
| 2007/0220292 A1 | 9/2007 | Ishihara et al. |
| 2007/0276645 A1 * | 11/2007 | Veller et al. ..................... 703/18 |
| 2008/0163143 A1 * | 7/2008 | Kwon ................................. 716/5 |
| 2008/0300806 A1 | 12/2008 | Nakanishi |
| 2012/0144216 A1 * | 6/2012 | Hsieh et al. ................... 713/320 |
| 2012/0245915 A1 * | 9/2012 | Kageshima ..................... 703/14 |

OTHER PUBLICATIONS

Lee et al., "PowerViP: SoC Power Estimation Framework at Transaction Level," Proceedings of the 2006 Asia and South Pacific Design Automation Conference, Jan. 2006, pp. 551-558.

Conti et al., "Extension of SystemC framework towards power analysis," Forum on Specification & Design Languages, Sep. 22-24, 2009, pp. 1-4.

Ahuja et al., "Power Estimation Methodology for a High-Level Synthesis Framework," Quality of Electronic Design (ISQED), Mar. 16-18, 2009, pp. 541-546.

Dhanwada et al., "A Power Estimation Methodology for SystemC Transaction Level Models," Third IEEE/ACM/IFIP International Conference on Hardware/Software Codesign and System Synthesis (CODES+ISSS'05), Sep. 19-21, 2005, pp. 142-147.

Bansal et al., "Automatic Power Modeling of Infrastructure IP for System-on-Chip Power Analysis," 20th International Conference on VLSI Design, Jan. 6-10, 2007, pp. 513-520.

"Office Action of Taiwan Counterpart Application", issued on Nov. 19, 2013, p. 1-p. 10, in which the listed references were cited.

* cited by examiner

METHOD FOR INSERTING CHARACTERISTIC EXTRACTOR

CROSS-REFERENCE TO RELATED APPLICATION

This application is a continuation-in-part application of and claims the priority benefit of U.S. application Ser. No. 13/041,443, filed on Mar. 7, 2011, now pending. The U.S. application Ser. No. 13/041,443 claims the priority benefit of Taiwan application serial no. 99142387, filed on Dec. 6, 2010. The entirety of each of the above-mentioned patent applications is hereby incorporated by reference herein and made a part of this specification.

TECHNICAL FIELD

The disclosure relates to a characteristic extractor inserting method.

BACKGROUND

With the significant growth of the hardware and software design complexity, the modern SoC development cycle is also greatly increased. Using the traditional register transfer level (RTL) design methodology is too time-consuming especially for the modern SoC design which needs a high integration of software and hardware. Therefore, it has become the inevitable trend to adopt the electronic system level (ESL) design methodology to improve the productivity of modern system design. To further reuse the developed ESL model, a high-level synthesis tool is widely used to change the ESL model into the RTL.

Power consumption has always been a crucial problem of a chip due to the increasing hardware complexity and operating frequency. Currently, many researches point out that the minimizing power consumption in ESL can have better power gain than in the RTL or gate level. According to the report of the International Technology Roadmap for Semiconductor (ITRS) in 2009, 50% power saving will be achieved in ESL in 2011; and it will go up to 80% in 2015 while we minimizing power consumption in ESL. In the ESL, the transaction level (TL) has the widest range of application. Therefore, it is necessary to estimate the power in an earlier stage of design and at a higher design level—transaction level. However, there are many difficulties for the designers to make estimation and analysis of the power consumption from the TL in the early stage of design. The designers might not effectively provision and plan characteristic extractor in the TL of design.

SUMMARY

The disclosure provides a method for inserting characteristic extractor into an electronic device of a target system and the characteristic extractor can extract at least a characteristic of the electronic device.

According to an embodiment of the disclosure, a method for inserting characteristic extractor is provided, which includes parsing a transaction level model (TLM) of an electronic device of a target system to find out at least one target point of an operation status of the electronic device; and inserting at least one characteristic extractor according to the at least one target point.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The electronic system level (ESL) design method shows the evidence of effectively reducing the development cycle of the system software and hardware and increasing the Time-to-Market benefits of the products. The TL simulation of the system under development (hereinafter referred to as the target system) can be proceed by using a simulation platform. The simulation platform may be a computer platform that runs electronic design automation (EDA) software and may also be another simulation platform with the TL simulation capability. Along with the increasing complexity of the system design, the problem of power consumption becomes more important, and designers need making necessary consideration and plan of the problem of power consumption in the early stage of design. However, the ESL power estimation method in the prior arts is still immature. In the following embodiment of the disclosure, a system power estimation infrastructure is provided to convert a virtual electronic device of an original system design into an electronic device with a high-level power estimation capability.

Figure 1:
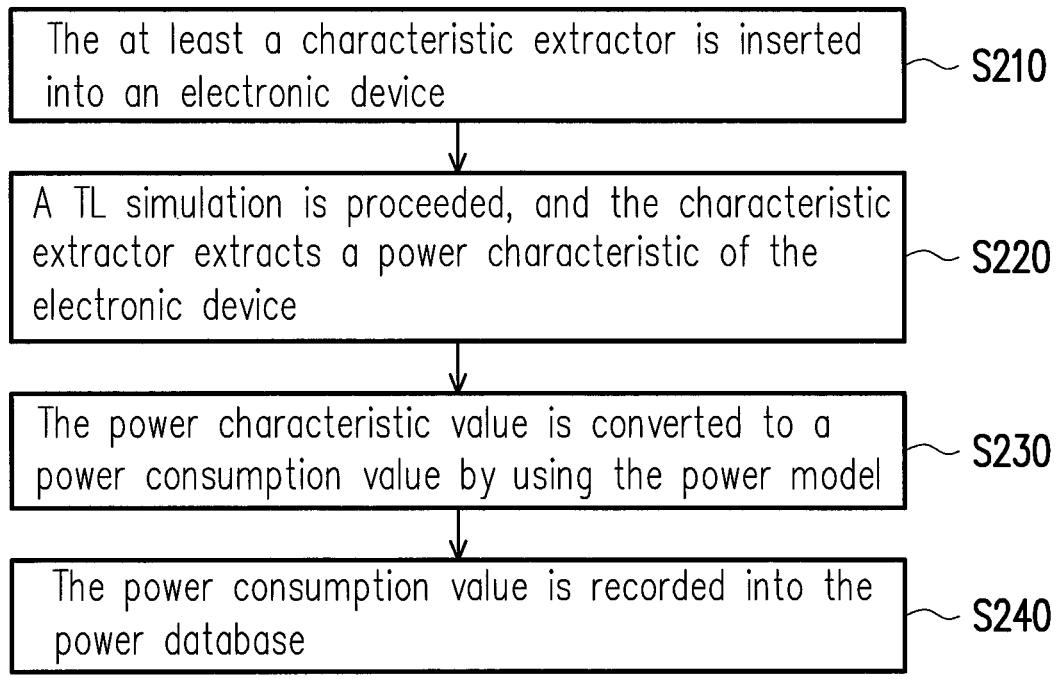
FIG. 1 is a schematic flow chart illustrating a TL system power estimation method according to an embodiment of the disclosure.
Figure 2:
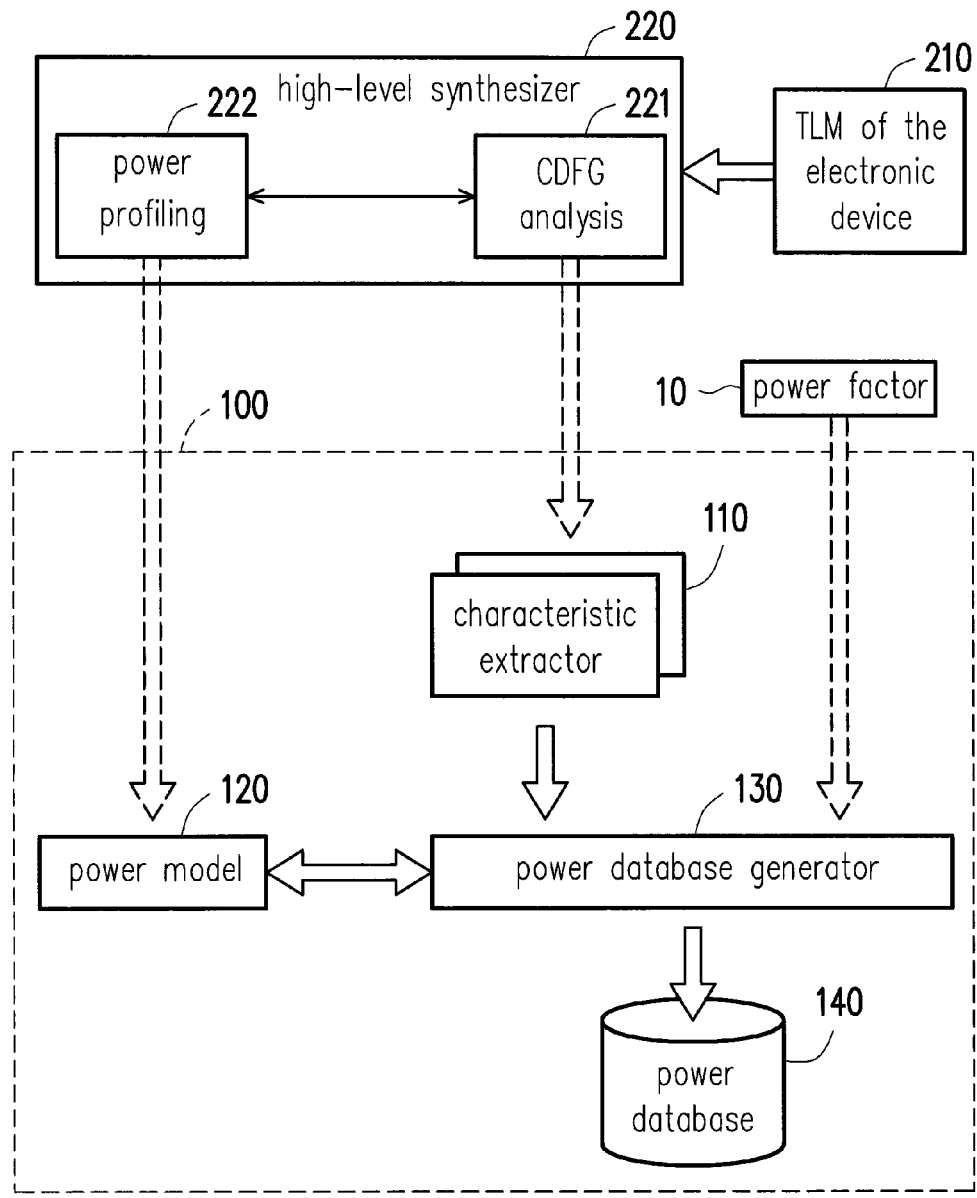
FIG. 2 is a schematic block view illustrating functions of a system power estimation system according to an embodiment of the disclosure.

FIG. 1 is a schematic flow chart illustrating a TL system power estimation method according to an embodiment of the disclosure. FIG. 2 is a schematic block view illustrating functions of a system power estimation system according to an embodiment of the disclosure. The system power estimation system includes a simulation platform and a system power estimation infrastructure 100. The system power estimation infrastructure 100 includes at least one characteristic extractor 110, a power model 120, a power database generator 130 and a power database 140. Referring to FIG. 1 and FIG. 2, in step S210, the at least one characteristic extractor 110 is inserted into at least one electronic device of the target system. In step S210, the characteristic extractor 110 inserting method is proceeded, in which the transaction level model (TLM) 210 of the electronic device of the target system is parsed, and then according to preset inserting constraints (e.g. the amount of the inserted characteristic extractor 110 set in advance) appropriate inserting positions are found in the electronic device, and then the characteristic extractor 110 is inserted in the electronic device. For example, in step S210 a TLM 210 of the electronic device is parsed to obtain a control data flow graph (CDFG), then a branch path of an operation status of the electronic device is found from the CDFG, and then the characteristic extractor 110 is inserted into the branch path.

Figure 3:
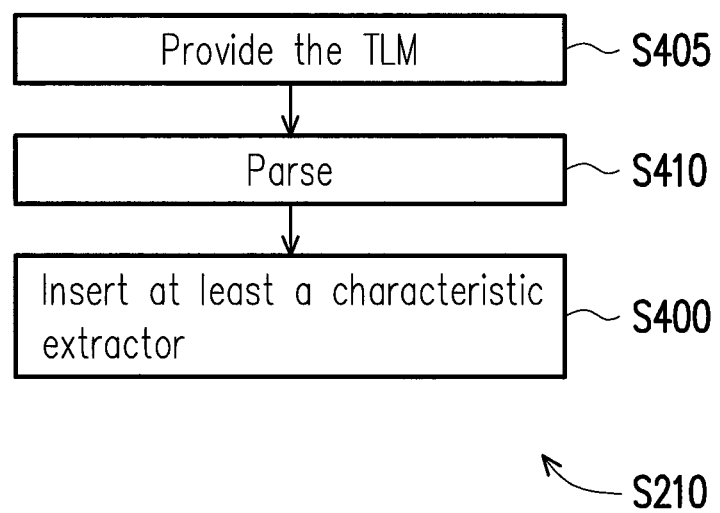
FIG. 3 is a schematic flow chart of a method for inserting characteristic extractor according to an embodiment of the disclosure.

Herein, FIG. 3 illustrates the embodiment of step S210 in FIG. 1. FIG. 3 is a flow chart illustrating a characteristic extractor 110 inserting method according to an embodiment of the disclosure. In step S405, the TLM of the electronic device (e.g. the DMA controller 330 in FIG. 4) of the target system (e.g. the system 300 in FIG. 4) is provided to the simulation platform. The simulation platform is performing the step S410 for parsing the TLM of the electronic device to obtain the CDFG of the electronic device. The step S400 is performed to find out at least one target point of an operation status of the electronic device, and insert at least one characteristic extractor into the target point.

Referring to FIG. 1 and FIG. 2, a TL simulation of the target system is performed on the simulation platform (step S220). The at least one characteristic extractor 110 extracts at least one power characteristic of the electronic device during the TL simulation, and transfers the at least one power characteristic to the power database generator 130. The at least one power characteristic includes a time stamp and/or a status information.

The power model 120 records the high-level power consumption model of the electronic device. For example, the power model 120 records and provides a coefficient value (such as a dynamic power coefficient or other coefficient values) and/or a calculation formula for calculating the power consumption value of the electronic device. Also, for example, the power model 120 records power information (such as a static power value, a dynamic power value or other power information) of the electronic device under different operating status. The user may input the power information into the power model 120 according to the specification of the electronic device or may manually set the power information of the power model 120 or input the simulated power information to the power model provided here in the conventional low-level abstract level simulation manner. The low-level abstract level simulation is for example a power simulation of a register transfer level (RTL), a gate level and a transistor level etc.

In the embodiment where the high-level synthesizer 220 is used, the high-level synthesizer 220 may be used to produce the power model 120, so the design model under the TL development may have the reliable power model 120 for analysis and use without waiting for creating the power model until the model design is proceeding to the RTL or gate level, which indeed realizing the concept of the top-down design flow. The high-level synthesizer 220 may be any high-level synthesis tool software that is well known in this field currently or in future. The high-level synthesizer 220 may parse/synthesize the TLM 210 of the electronic device of the target system. Generally speaking, the high-level synthesizer 220 has a CDFG analysis function 221 and a power profiling function 222. The function 221 and the function 222 are the well known techniques in this field, and the details will not be repeated herein again.

The CDFG analysis function 221 may parse a TLM 210 of the electronic device to obtain a CDFG. Then, the CDFG analysis function 221 may proceed the characteristic extractor 110 inserting method (e.g. the aforementioned step S210) illustrated in the embodiments of the disclosure, for finding out a branch path of the operation status of the TLM 210 from the CDFG and automatically inserting the characteristic extractor 110 into the branch path.

The power profiling function 222 may synthesize the TLM 210 into a low-level model and then obtain the power information of partial or all branch paths of the CDFG based on an analysis result of the CDFG analysis function 221 in a low-level simulation manner. The power profiling function 222 creates the power model 120 by using the power information of partial or all branch paths of the CDFG based on the simulation requirement of the user. Therefore, the power profiling function 222 realizes the top-down power model creation. Since the power profiling function 222 obtains the power information of the power model 120 in a low-level simulation manner, a high accuracy high-level power estimation may be realized in the design stage of the ESL.

Referring to FIG. 1 and FIG. 2, in step S230, the power database generator 130 converts the at least one power characteristic provided from the at least one characteristic extractor 110 to at least one power consumption value by using the power model 120. Then, the power database generator 130 records the at least one power consumption value and the corresponding time stamp into the power database 140 (step S240), for the power analyzing of the whole target system. The power consumption value may include a dynamic power consumption value and/or a static power consumption value.

In other embodiments, if the target system has the dynamic power management (DPM) function, the power database generator 130 may receive an additional power factor 10 from the DPM controller, the power management unit (PMU) and/or other control circuits of the target system. The power factor 10 may be an operating voltage, a clock frequency and/or a DPM status of the electronic device. The DPM status which may include power gating, clock gating and/or a sleeping mode. The power database generator 130 converts the power characteristic provided from characteristic extractor 110 to the power consumption value by using the power factor 10 and power model 120 and records the power consumption value and the corresponding time stamp into the power database 140. With the input of an additional power factor 10, power database generator 130 of the system power estimation infrastructure 100 may dynamically adjust and correctly reflect the power consumption at different status.

The characteristic extractor 110 inserted into the electronic device only informs the power database generator 130 of the power characteristic (such as the operating status of the electronic device) of the electronic device and will not interfere the operating of the electronic device, so the TLM of the electronic device does not need to rewrite. In the circumstance that the original design model content of the electronic device does not need to be modified, the system power estimation infrastructure 100 converts one TLM into the TLM with a power information reporting function by using the characteristic of the four-element, and thus all kinds of the power model may be flexibly used and the software and hardware system power simulation analysis, low power architecture exploration and strategy formulation of the dynamic power management may be proceeded at different time sequence levels. Moreover, the infrastructure conversion may be automated by using the high-level synthesis technique, which further reduces the cycle of the design and realizes the high-level power estimation in the early stage of the design.

Figure 4:
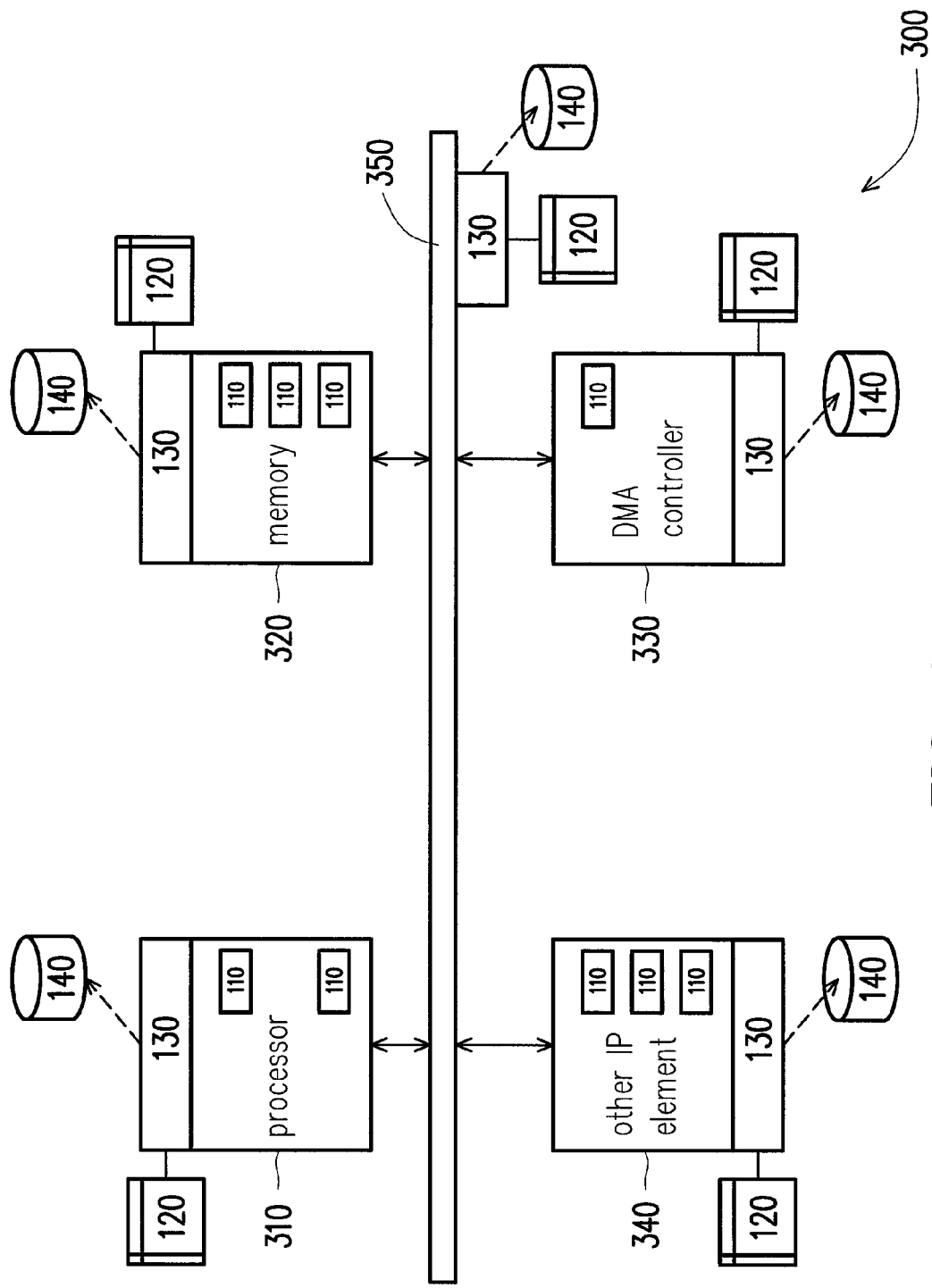
FIG. 4 is a schematic view illustrating a function module of a target system according to an embodiment of the disclosure.

The system power estimation infrastructure 100 may be applied the TLM of the target system of any form. For example, FIG. 4 is a schematic view illustrating a function module of a target system 300 according to an embodiment of the disclosure. Referring to FIG. 4, the target system 300 includes plural electronic devices such as a processor 310, a memory 320, a direct memory access (DMA) controller 330, other intellectual property (IP) element 340 and a bus 350. The processor 310 may be a central processing unit (CPU), a digital signal processor (DSP), a micro-controller or other processors/controllers. The processor 310, the memory 320, the DMA controller 330, the IP element 340 are communicated through the bus 350.

According to the description of the above embodiments, the system power estimation infrastructure 100 may be applied in the electronic device such as the processor 310, the memory 320, the DMA controller 330, the IP element 340 and the bus 350 in FIG. 4. After the corresponding characteristic extractor 110 is inserted into each electronic device, the characteristic extractor 110 may be connected with the power database generator 130 and the power model 120. In the course of simulation, the power database generator 130 of each electronic device in the target system 300 may automatically accept the power characteristic transferred by the respective characteristic extractor 110. The power database generators 130 together with the respective power model 120 and/or additional power factor 10 produces the respective power database 140, as shown in FIG. 2. The power consumption value recorded in the power database 140 of the electronic devices (e.g. the electronic devices 310, 320, 330, 340, 350 etc.) in the target system 300 are added to become the power consumption value of the whole target system 300. Therefore, the high-level power estimation of the whole target system may be realized in the design stage of the ESL.

Figure 5:
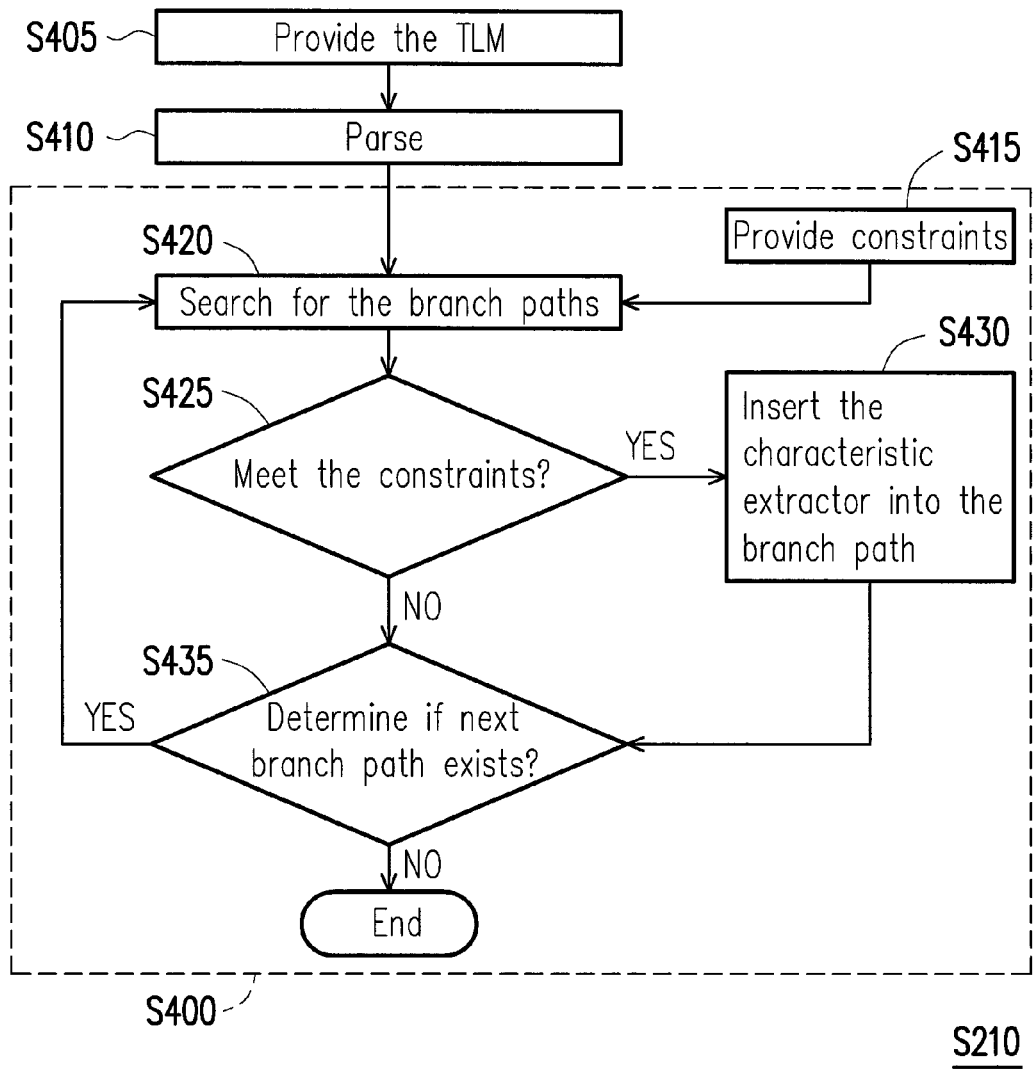
FIG. 5 is a schematic flow chart of a method for inserting characteristic extractor according to an another embodiment of the disclosure.

Herein, FIG. 5 illustrates another embodiment of step S210 in FIG. 1. FIG 5 is a flow chart illustrating a characteristic extractor 110 inserting method according to another embodiment of the disclosure. Steps S405, S410 and S400 in FIG. 5 may refer to the related descriptions of steps S405, S410 and S400 in FIG. 3. In this embodiment, the step S400 includes steps S415, S420, S425, S430 and S435.

In step S415, the preset constraints (e.g. the amount of the inserted characteristic extractor 110 set in advance) are provided to the simulation platform. Then, in step S420, according to the inserting constraint of step S415, the appropriate inserting positions (e.g. a start point of a branch path) are found in the processor 310. The constraint may be determined according to the intellectual property specification of the processor 310, or set by the user manually, or set according to a key status required by the design.

In step S425, it is determined if the currently found branch path meets the constraint. If the currently found branch path does not meet the constraint, the process goes to step S435 for determining if next branch path exists. In step S425, it is determined if the currently found branch path meets the constraint, step S430 is proceeded for inserting the characteristic extractor 110 into the currently found target points (e.g. branch path). In step S435, it is determined if the unexamined branch path exists. If the unexamined branch path exists, the process returns to step S420 for finding out next branch path. If in step S435, it is determined that all the branch paths of the processor 310 are examined, the step S210 in FIG. 1 is completed.

Here, a part of pseudo codes of the TLM of the processor 310 are assumed as follows:

```
SC_MODULE(DSP)
{
    ......
    if (run_flag)
    {
        if(cache-miss_flag)
        {
            ......
        } else
        {
            ......
        }
    } else if(config_flag)
    {
        ......
    } else
    {                           //idle
        ......
    }
    ......
}
```

The pseudo code may represent the source code of the TLM of the processor 310. Here, the constraint in step S415 is assumed to be "all the branch paths," in step S430, a characteristic extractor 110 is inserted into the 4 branch paths (target points) respectively. A part of the pseudo codes of the TLM with the characteristic extractor 110 inserted are illustrated as follows:

```
SC_MODULE(DSP)
{
    PowerDatabaseGen DSP_PDG;       //link power database generator 130
    DSP_PDG(DSP_PowerModel);        //link power model 120
    ......
    if (run_flag)
    {
        if(cache-miss_flag)
        {
            DSP_PDG.PowerExtractor(Characteristic(Cache-miss)); //the first
                                                characteristic extractor 110
            ......
        } else
        {
            DSP_PDG.PowerExtractor(Characteristic(Active));     //the
                                            second characteristic extractor 110
            ......
        }
    } else if(config_flag)
    {
        DSP_PDG.PowerExtractor(Characteristic(Conf));     //the third
                                            characteristic extractor 110
```

-continued

```
        ......
    } else
    {                                                    //idle
        DSP_PDG.PowerExtractor(Characteristic(Idle));    //the fourth
                                              characteristic extractor 110
        ......
    }
    ......
}
```

Therefore, in step S220, the characteristic extractor 110 inserted into the processor 310 extracts the power characteristic of the processor 310 when the target system 300 is performing the TL simulation, that is, transfers the operating status currently proceeded by the processor 310 to the power database generator 130.

The power database generator 130 converts the power characteristic provided from the characteristic extractor 110 to the power consumption value by using the power model 120. In this embodiment, the power model 120 includes a look-up table. The look-up table includes a mode field, a dynamic power coefficient field and/or a static power coefficient field. For example, the power model 120 of the DMA controller 330 may include the look-up table of Table 1.

TABLE 1

Power model 120 of the DMA controller 330

| MODE | DYNAMIC POWER COEFFICIENT | STATIC POWER COEFFICIENT |
|---|---|---|
| Active Status Mode_1 | 0.00006683 | 0.00533 |
| Idle Status Mode_2 | 0.00005995 | 0.00532 |

In step S230, the power database generator 130 of the DMA controller 330 obtains the power characteristic (here, the operating status/mode) of the DMA controller 330 from the characteristic extractor 110 of the DMA controller 330. Based on the current operating status/mode provided from the characteristic extractor 110, the power database generator 130 may search the mode field from the power model 120 (the look-up table of Table 1) of the DMA controller 330 to obtain the corresponding dynamic power coefficient field value and the static power coefficient field value form the look-up table. The dynamic power coefficient field value may be a dynamic energy coefficient or a dynamic current coefficient. If the dynamic power coefficient field value is the dynamic energy coefficient, the power database generator 130 may calculate the dynamic power value of the DMA controller 330 in the current operating status/mode to be the dynamic power value=dynamic energy coefficient×clock frequency, in which the clock frequency is the operating frequency of the DMA controller 330. If the dynamic power coefficient field value is the dynamic current coefficient, the power database generator 130 may calculate the dynamic power value of the DMA controller 330 in the current operating status/mode to be the dynamic power value=dynamic current coefficient×voltage value×clock frequency. The static power coefficient field value may directly be the static power value or the static current coefficient. If the static power coefficient field value is the static current coefficient, the power database generator 130 may calculate the static power value of the DMA controller 330 in the current operating status/mode to be the static power value=static current coefficient×voltage value, in which the voltage value is the operating voltage (e.g. operating voltage VDD provided by the "power factor 10" in FIG. 2) of the DMA controller 330. The dynamic power value and the static power value serving as the clock frequency are taken as the power consumption value of the DMA controller 330. Then, the power database generator 130 may write the identification code, the current operating status/mode, the static power, the dynamic power and the corresponding time stamp of the DMA controller 330 into the power database 140.

The database generator 130 of the electronic devices such as the processor 310, the memory 320, the DMA controller 330, other IP elements 340 and the bus 350 may calculate the respective static power and/or dynamic power during the TL simulation. Then, the database generator 130 may write the identification code, the current operating status/mode, the static power, the dynamic power and the corresponding time stamp of each electronic device into the power database 140. The application of the embodiment may realize the power database 140 in any data structure. For example, the power database 140 may include the mode field, the time stamp field and the power consumption value field. The power consumption value field may include the dynamic power field and/or the static power field. Table 2 illustrates the example content of the power database 140 of the target system 300, in which the identification code "1" indicates the memory 320.

TABLE 2

Content of the power database 140 of the target system 300

| IDENT-IFICATION CODE | TIME STAMP | DYNAMIC POWER | STATIC POWER | MODE |
|---|---|---|---|---|
| 1 | 0 | 0 | 0.00082 | idle status |
| 1 | 0 | 0.053880 | 0.003786 | writing status |
| 1 | 570118 ns | 0.029722 | 0.001438 | reading status |
| 1 | 670251 ns | 0.037472 | 0.001438 | reading status |
| ... | ... | ... | ... | ... |

In the embodiment, the characteristic extractor 110 is inserted into the electronic device of the target system 300, so that the characteristic extractor 110 may extract a power characteristic of the electronic device when the TL simulation of the target system 300 is performing. The power database generator 130 converts the power characteristic output by the characteristic extractor 110 during the TL simulation to the power consumption value by using the power model 120 corresponding to the electronic device. Therefore, the high-level power estimation is realized in the design stage of the ESL, thus it can be used to minimizing power consumption at early design stage to obtain better power saving. The experimental data shows that the power estimation method of the above embodiments may achieve the above 90% accuracy.

The power database generator 130 of the above embodiments may support the dynamic power management (DPM). If the system 300 uses a certain controller (e.g. the power management unit (PMU)) to dynamically control the clock frequency, the operating voltage and the power operating mode (such as the active mode and the sleeping mode), the certain controller may input the relevant information (i.e. the power factor 10) of the dynamic power management to the power database generator 130. The major function of the power database generator 130 is to collect the necessary information in the TL simulation and convert the information to the power consumption value. Therefore, the power database generator 130 may dynamically adjust and correctly reflect the power consumption in different status.

Figure 6:
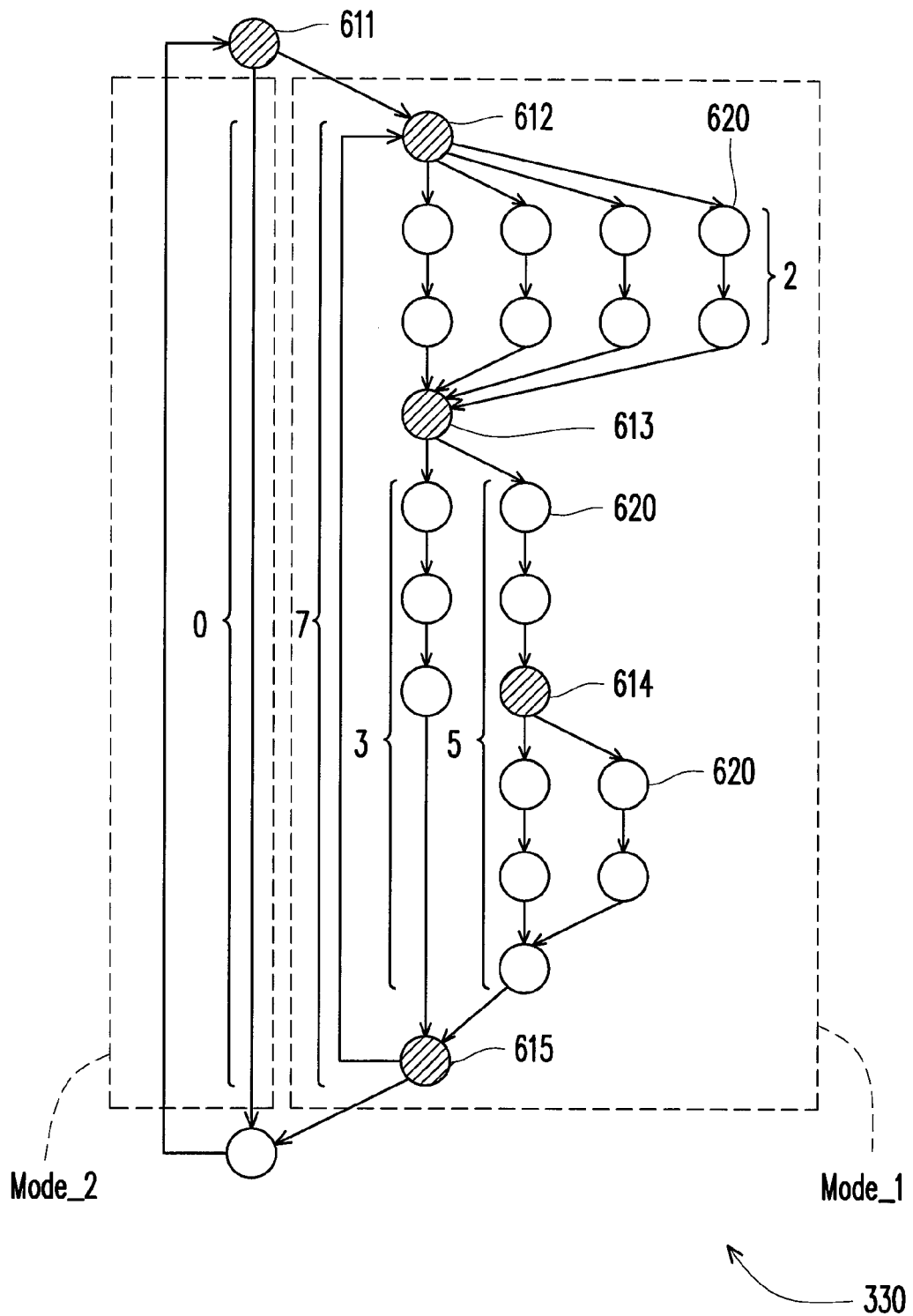
FIG. 6 is a control data flow graph (CDFG) illustrating a direct memory access controller in FIG. 4 according to an embodiment of the disclosure.

The embodiment of step S210 in FIG. 1 is not limited to the related description of above embodiment. Here, the DMA controller 330 is taken as an example to illustrate another embodiment of step S210 in FIG. 1. In the step of "finding out the target point of the electronic device" in this embodiment, after the TLM of the electronic device (DMA controller 330) is parsed on the simulation platform, the CDFG of the DMA controller 330 is obtained. For example, FIG. 6 is a CDFG illustrating a DMA controller 330 in FIG. 4 according to an embodiment of the disclosure. In the figure, the graph with the slash background indicates branch points 611~615, and the hollow circle indicates the operand (operation action or operation instruction) 620. The DMA controller 330 enters one of the plural branch paths based on the determination of the branch point 611~615.

Then, the simulation platform finds out plural branch points of the DMA controller 330 from the CDFG. 5 branch points 611~615 are shown in FIG. 6, each branch point 611~615 has different numbers of the branch paths, and the paths respectively have one or plural operands 620 with different numbers.

Then, the simulation platform calculates an operand amount of each branch path of each branch point 611~615. For example, there are 4 branch paths between the branch point 612 to the branch point 613, and the branch paths respectively have 2 operands 620. Also, for example, the branch point 613 has 2 branch paths, in which the branch path from the branch point 613 to the branch point 615 has 3 operands 620, and the branch path from the branch point 613 to the branch point 615 via the branch point 614 has the longest path with 5 operands 620. Then, for example, the branch point 611 has 2 branch paths, which respectively have 0 and 7 operands 620, as shown in FIG. 6.

Then, the simulation platform calculates the operand amount difference of each branch point 611~615. The so-called operand amount difference refers to the difference of the operand number between the branch path with the most operand 620 and the branch path with the least operand 620 on the branch point. For example, 4 branch paths of the branch point 612 respectively have 2 operands 620, so the operand amount difference of the branch point 612 is 2−2=0. Also, for example, the branch point 613 has 2 branch paths, and the operand amount of the 2 branch paths is respectively 3 operands and 5 operands, so the operand amount difference of the branch point 613 is 5−3=2. Then, for example, the branch point 611 has 2 branch paths, and the operand amount of the 2 branch paths is respectively 0 operand and 7 operands, so the operand amount difference of the branch point 611 is 7−0=7.

Based on the calculated operand amount difference, at least one target point is selected from the branch points 611~615. Then, the characteristic extractor 110 is inserted into the branch path of the at least one target point. The step of selecting at least one target point may be realized in any manner. For example, one threshold is defined, and then the branch point with the operand amount difference greater than and equal to the threshold is selected from the branch points 611~615 to serve as the at least one target point. For example, if the threshold is set to 2, the branch point 611 and the branch point 613 are selected to serve as the target point. If the threshold is set to 0, all the branch points 611~615 are selected to serve as the target point.

In this embodiment, in the step of selecting at least one target point, the branch point with the most operand amount difference may also be selected from the branch points 611~615 to serve as the at least one target point. For example, in FIG. 6, since the operand amount difference of the branch point 611 is the largest, the branch point 611 is selected to be the target point. Therefore, the simulation platform can automatically define the power modes according to the target points. That is to say, the power mode of the DMA controller 330 is divided into the idle status Mode_2 and the active status Mode_1 in this embodiment.

Here, a part of pseudo codes of the TLM of DMA controller 330 are assumed as follows:

```
SC_MODULE(DMA)
{
    ......
    If(DMA_EN_Flag)
    {
        ......
    } else
    {                           //idle
        ......
    }
    ......
}
```

The pseudo code may represent the source code of the TLM of the DMA controller 330. If the event DMA_EN_Flag does not stand, the DMA controller 330 enters the idle status Mode_2. If the event DMA_EN_Flag stands, the DMA controller 330 enters the active status Mode_1. Since the branch point 611 is selected to be the target point, one characteristic extractor 110 is inserted into the 2 branch paths of the branch point 611 respectively. A part of the pseudo codes of the TLM after the characteristic extractor 110 is inserted are illustrated as follows:

```
SC_MODULE(DMA)
{
    PowerDatabaseGen DMA_PDG;      //link power database
    generator 130
    DMA_PDG(DMA_PowerModel);       //link power model 120
    ......
    If(DMA_EN_Flag)
    {
        ......
        DMA_PDG.PowerExtractor(Characteristic(Mode_1));   //the first
                                                characteristic extractor 110
        ......
    } else
    {                                                      //idle
        ......
        DMA_PDG.PowerExtractor(Characteristic(Mode_2));   //the second
                                                characteristic extractor 110
        ......
    }
    ......
}
```

Therefore, the characteristic extractor 110 inserted into the DMA controller 330 may extract the power characteristic of the DMA controller 330 during the TL simulation when the TL simulation of the target system 300 is performing, that is, transfer the operating status currently proceeded by the DMA controller 330 to the power database generator 130.

Figure 7:
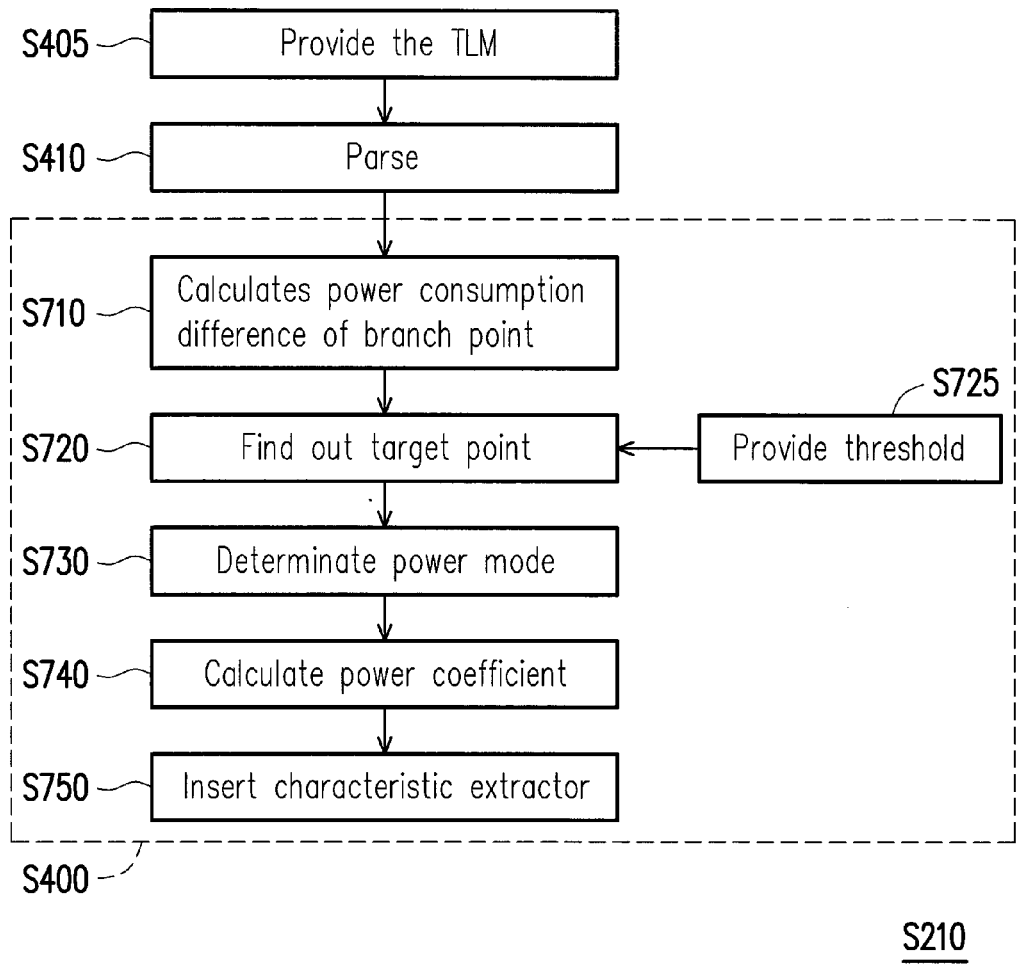
FIG. 7 is a schematic flow chart of a method for calculating a power coefficient and inserting the characteristic extractor according to another embodiment of the disclosure.

The embodiment of step S210 in FIG. 1 is not limited to the related description in FIG. 5. For example, FIG. 7 is a schematic flow chart of a method for calculating a power coefficient and inserting the characteristic extractor 110 according to another embodiment of the disclosure. The method illustrated in FIG. 7 may be another embodiment of step S210 in FIG. 1. Steps S405, S410 and S400 in FIG. 7 may refer to the related descriptions of steps S405, S410 and S400 in FIG. 3 and FIG. 5. In this embodiment, the step S400 of FIG. 7 includes steps S710, S720, S725, S730, S740 and S750. The simulation platform performs step S410 to allow the TLM of the electronic device of the target system to proceed the source level parsing so as to obtain a CDFG of the electronic device. In the embodiment illustrated in FIG. 7, the step S400 includes steps S710, S720, S725, S730, S5740 and S750. Pre-set constraints (e.g. a preset inserting number, a threshold of the power coefficient, or other constraints on the characteristic extractor) are provided to the simulation platform in step S725. The constraints provided in step S725 may be determined based on the intellectual property specification of the electronic device, or manually set by the user, or set according to a key status required by the design.

Step S710 calculate a power consumption difference of each branch point in the CDFG of the electronic device. For example, the simulation platform may execute the step S710 to find out plural branch points in the CDFG of the electronic device, wherein each of the branch points has plural branch paths. A power consumption of operand in each branch path of each branch point is cumulated respectively in the step S710. Therefore, the power consumption difference of each branch point can be calculated. Step S720 determine appropriate inserting positions (target points) such as the beginning of a branch path in the CDFG, and/or the beginning of a loop in the CDFG according to the power consumption difference of step S710 and the inserting constraints of step S725. According to the target points found in step S720, a power mode (or an operation status) of the electronic device is determined in the CDFG in step S730. According to the power mode determined in step S730, power coefficients in different power modes are able to be calculated and create the power model 120 of the electronic device based on the power coefficients in step S740. In step S750, the characteristic extractor may be inserted into the target points found in step S720, which may refer to the related descriptions in step S430 in FIG. 5.

Figure 8A:
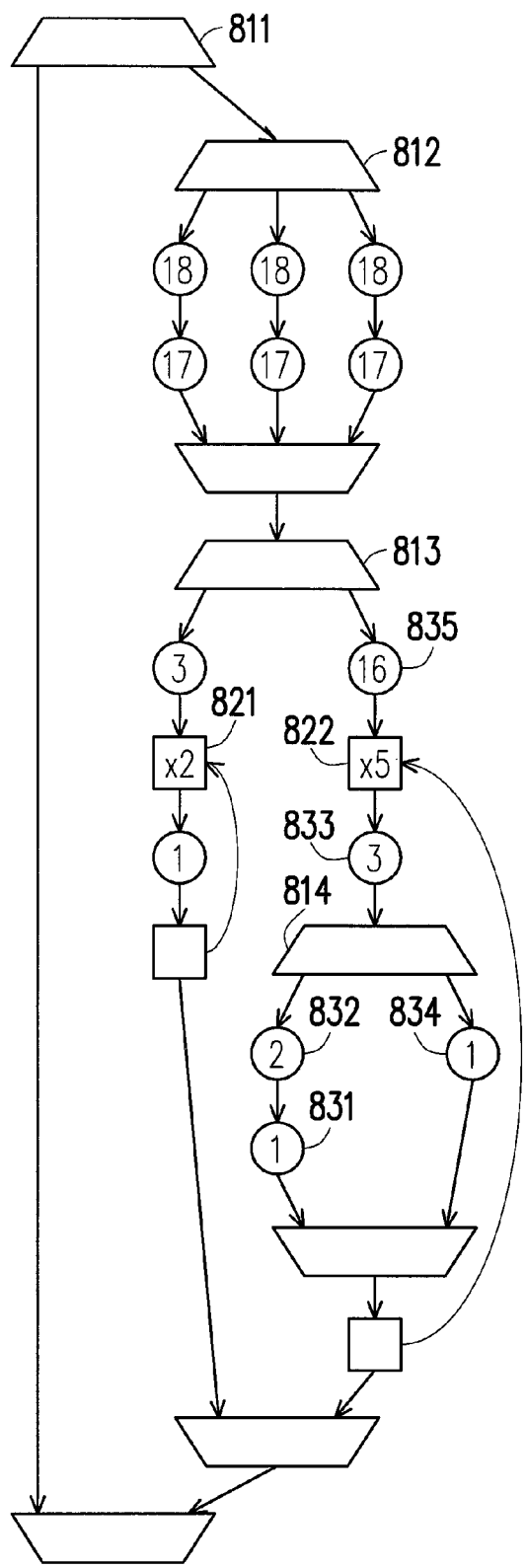
FIG. 8A is a schematic diagram of a CDFG of an electronic device according to an embodiment of the disclosure.

A detailed embodiment of steps S710, S720 and S730 will be described hereinafter. For example, FIG. 8A is a schematic diagram of a CDFG of an electronic device according to an embodiment of the disclosure, wherein trapezoids represent branch points (e.g. branch points 811, 812, 813, and 814), squares represent loops (e.g. loops 821 and 822). Hollow circles in FIG. 8A represent operands such as operations or operating instructions. The simulation platform may find out all branch points 811, 812, 813, and 814 in the CDFG of the electronic device in FIG. 8A.

The simulation platform may cumulate power consumptions of the operands in each of the branch paths of each of the branch points respectively. The operands with different functions normally have different power consumptions. The data of the power consumptions of such operands may be determined based on the intellectual property (IP) specification of the electronic device. In the present embodiment, assume that the power consumption value of each of the operands is 1. FIG. 8A illustrates a cumulated result (cumulating from the bottom to the top of FIG. 8A along with the control data flow). The number within each of the circles represents the current cumulated result of the power consumption from the operand at the bottom in FIG. 8A. For example, since there exists no other operands below an operator 831, the cumulated power consumption value of the operand 831 is "1" (i.e. the power consumption is the power consumption of the operand 831 itself). The cumulated power consumption value of an operand 832 is "2" since the power consumption of the operand 832 itself "1" is added by the cumulated power consumption of the operand 831 below "1". In terms of an operand 833, a next operation may be the operand 832 or an operand 834. The branch path with the maximum cumulated power consumption value is selected in the present embodiment. Hence, the cumulated power consumption of the operand 833 is "3" since the power consumption value of the operand 833 itself "1" is added by the cumulated power consumption value of the operand 832 below "2".

As illustrated in FIG. 8A, the number within each of the squares represent the number of re-execution times of the loop. With respect to an operand 835, the next loop 822 needs to re-execute 5 times. That is, the power consumption value (or the cumulated power consumption value) of the loop 822 is 3×5=15. Therefore, the cumulated power consumption of the operand 835 is "16" since the power consumption value of the operand 835 itself "1" is added by the cumulated power consumption value of the loop 822 below "15". The cumulated power consumption values of the other operands may be calculated in a similar fashion.

After the aforementioned cumulating operation is completed, the simulation platform calculates a power consumption difference of each of the branch points respectively. In the present embodiment, the power consumption difference refers to the difference between the maximum and the minimum of the power consumptions from different branch paths of a same branch point. For example, the power consumptions (cumulated power consumption values) of two branch paths of the branch point 811 in FIG. 8A are 0 and 18 respectively. Hence, the power consumption difference of the branch point 811 is 18−0=18. In a similar fashion, the power consumption difference of the branch point 812 is 18−18=0; the power consumption difference of the branch point 813 is 16−3=13; the power consumption difference of the branch point 814 is 2−1=1. The branch point 814 will be re-executed five times due to the loop 822, and therefore the power consumption difference of the branch point 814 may be calculated by (2−1)×5=5 in other embodiments.

Based on the power consumption differences, the simulation platform may select at least one target point from the branch points. In some embodiments, the simulation platform may select the branch point with the most power consumption difference to be the target point from the branch points. For example, the simulation platform may select the branch point 811 with the maximum power consumption difference (the power consumption difference is 18) to be the target point from the branch points 811~814. The simulation platform may select the branch paths of the target point (i.e. the branch point 811) for inserting the characteristic extractor. Therefore, it is determined that the electronic device may be divided into two power modes (or operation statuses) in step S730 in FIG. 7.

Figure 8B:
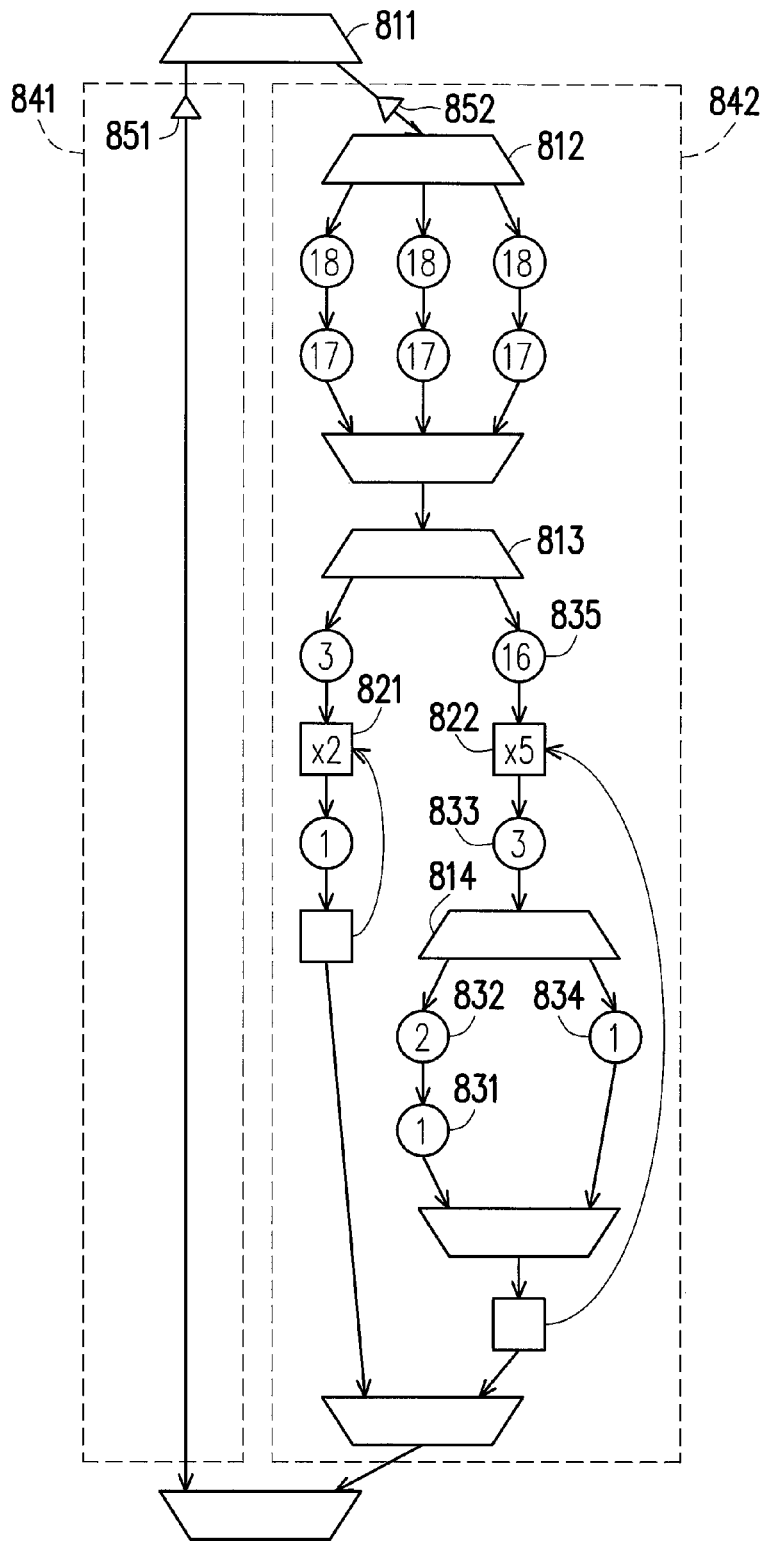
FIG. 8B is a schematic diagram of the CDFG divided into two power modes according to the embodiment in FIG. 8A.

For example, FIG. 8B is a schematic diagram of the CDFG divided into two power modes according to the embodiment in FIG. 8A. The simulation platform selects the branch point 811 to be the target point, and therefore in step S730 in FIG. 7, it is determined that the electronic device may be divided into a first power mode 841 and a second power mode 842 as illustrated in FIG. 8B. Hence, in step S750 in FIG. 7, characteristic extractors 851 and 852 may be inserted into the branch paths of the target points found in step S720 (e.g. the beginning of each of the branch paths of the branch point 811 as illustrated in FIG. 8B).

The embodiment of step S720 in FIG. 7 is not limited to the related description in the previous embodiment. For example, in other embodiments, the simulation platform may pre-define a threshold in the step S725, and select the branch points with the power consumption difference greater than the threshold from the branch points to be the target points. The threshold can be defined any value. For example, the simulation platform may analyse number of branch points with different power consumption difference, and select the power consumption difference with most number of branch points to serve as the threshold. In another embodiment, the simulation platform may select the most power consumption difference or other power consumption difference to serve as the threshold. For example, assume that the threshold is 10. The simulation platform may select the branch points 811 and 813 with the power consumption difference greater than 10 from the branch points 811~814 in FIG. 8A to be the target points, wherein the power consumption difference of the branch point 811 is 18, and the power consumption difference of the branch point 813 is 13. The simulation platform may select the branch paths of the branch points 811 and 813 to insert the characteristic extractors in step S750. Therefore, it is determined that the electronic device may be divided into four power modes (or operation statuses) in step S730 in FIG. 7.

Figure 8C:
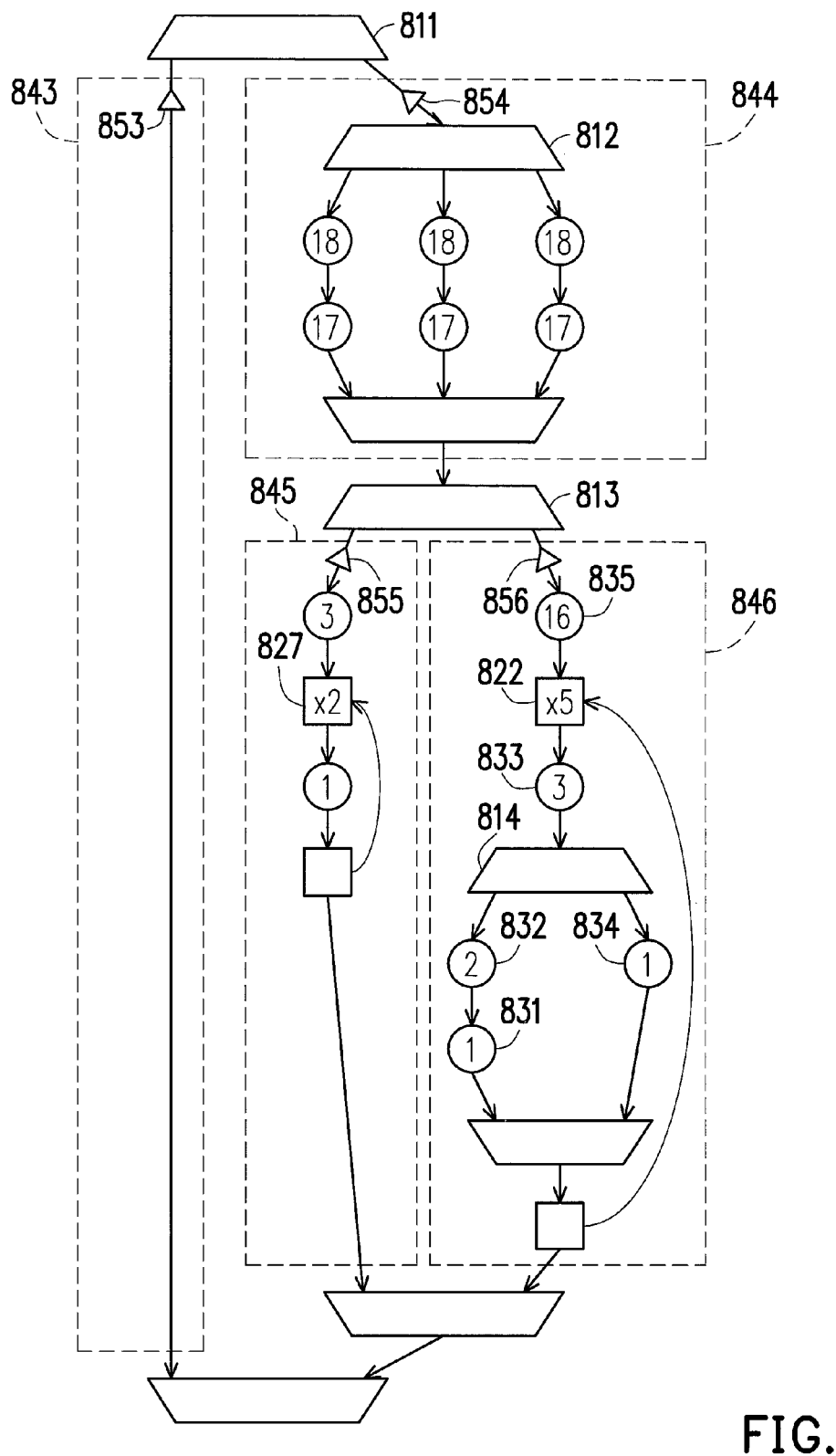
FIG. 8C is a schematic diagram of the CDFG divided into four power modes according to the embodiment in FIG. 8A.

For example, FIG. 8C is a schematic diagram of the CDFG divided into four power modes according to the embodiment in FIG. 8A. The simulation platform selects the branch points 811 and 813 to be the target points, and therefore in step S730 in FIG. 7, it is determined that the electronic device may be divided into a first power mode 843, a second power mode 844, a third power mode 845, and a fourth power mode 846. Hence, in step S750 in FIG. 7, characteristic extractors 853, 854, 855, and 856 may be inserted into the branch paths of the target points found in step S720 (e.g. the beginning of each of the branch paths of the branch points 811 and 813 as illustrated in FIG. 8C).

Figure 9:
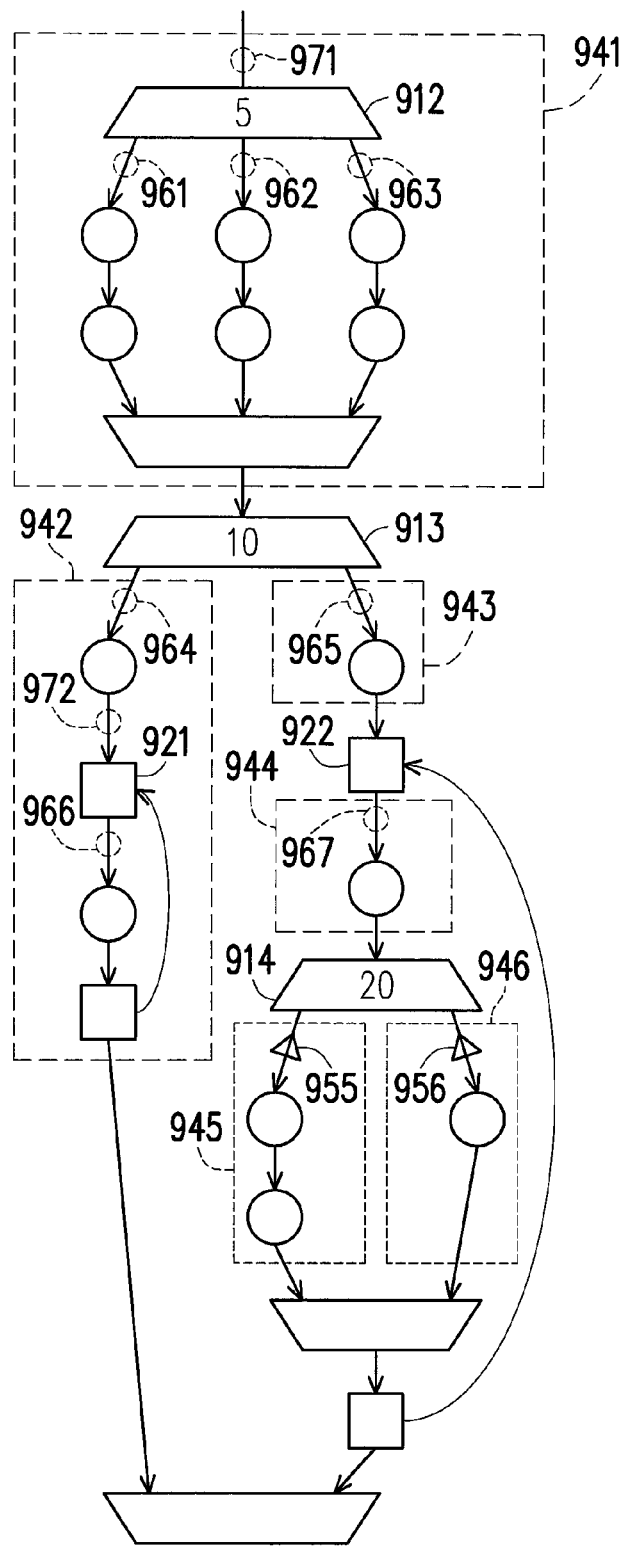
FIG. 9 is a schematic diagram of a CDFG of the electronic device according to another embodiment of the disclosure.

The embodiment of step S730 in FIG. 7 is not limited to the related description in the previous embodiment. For example, a detailed embodiment of step S730 will be illustrated hereinafter according to another embodiment in FIG. 9. FIG. 9 is a schematic diagram of a CDFG of the electronic device according to another embodiment of the disclosure, wherein trapezoids represent branch points (e.g. the branch points 912, 913, and 914), squares represent loops (e.g. the loops 921 and 922), and hollow circles represent operands. The number within each of the trapezoids represents the power consumption difference of the branch. In the present embodiment, assume that the simulation platform selects the branch point 914 in FIG. 9 to be the target point in step S720 as illustrated in FIG. 7, then the simulation platform determines that the electronic device may be divided into a power mode 945 and a power mode 946 as illustrated in FIG. 9. In step S750 as illustrated in FIG. 7, characteristic extractors 955 and 956 may be respectively inserted into the branch paths of the target points found in step S720 such as the beginning of each of the branch paths of the branch point 914.

However, the remainder operands are not divided into any power mode except the operands of the power modes 945 and 946. Therefore, in step S730, besides the target points found in step S720, the simulation platform may search for the remainder operands and find candidate positions at the beginning of the sequential operations which do not have a branch or loop, the beginning of each of the branch paths of each of the branch points, and the beginning of each of the loops in the CDFG as illustrated in FIG. 9. For example, the simulation platform may find candidate positions 961, 962, 963, 964, 965, 966, and 967 in the CDFG in FIG. 9. Then, the simulation platform may perform clustering on the candidate positions in a simple branch and a simple loop. The so-called "simple branch" refers that each branch path of a branch point has only one candidate position. The so-called "simple loop" refers to no branches within a loop. For example, the branch point 912 is a "simple branch", and the loop 921 is a "simple loop." And therefore, the simulation platform may perform clustering on the candidate positions 961~963 as illustrated in FIG. 9, that is, removing/deleting the candidate positions 961~963 which are after the branch point 912, and adding a candidate position 971 before the branch point 912. After the clustering operation, the branch 912 may be viewed as an equivalent operand. In a similar fashion, the simulation platform may perform clustering on the candidate position 966 in FIG. 9, that is, removing/deleting the candidate position 966 which is after the loop 921, and adding a candidate position 972 before the loop 921. After the clustering operation, the loop 921 may be entirely viewed as an equivalent operand.

After the aforementioned deleting operation and clustering operation, the simulation platform may then remove candidate positions between sequential operands. Since a candidate position 972 is positioned between sequential operands, (i.e. between an actual operand and an equivalent operand), the simulation platform may remove the candidate position 972. In other words, the simulation platform may remove the candidate position after the first operand of a branch path. In the embodiment illustrated in FIG. 9, since there exists no candidate positions after the first operand in each of the branch paths, the simulation platform does not perform removing/deleting operation on the candidate positions. Lastly, the simulation platform may determine the power modes 941, 942, 943, and 944 according to the rest candidate positions 971, 964, 965, and 967 after the aforementioned removing operation and clustering operation. The simulation platform further selects the rest candidate positions 971, 964, 965, and 967 to serve as the target points. In step S750 illustrated in FIG. 7, the characteristic extractors may be inserted into the rest candidate positions 971, 964, 965 and 967 except the characteristic extractors 955 and 956 in FIG. 9.

According to the power mode determined in step S730 of FIG. 7, power coefficients in different power modes are able to be calculated, and the power model 120 of the electronic device is created based on the power coefficients in step S740 of FIG. 7. For example, the simulation platform performs the step S730 in FIG. 7 to determine that the electronic device may be divided into the first power mode 841 and the second power mode 842 as illustrated in FIG. 8B. According to the power modes 841 and 842 determined in the step S730 of FIG. 7, the power coefficients of the power modes 841 and 842 in FIG. 8B may be calculated respectively to be 0 and 18 according to the step S740 in FIG. 7.

For example, the simulation platform performs the step S730 in FIG. 7 to determine that the electronic device may be divided into a first power mode 843, a second power mode 844, a third power mode 845, and a fourth power mode 846 as illustrated in FIG. 8C. According to the power modes 843~846 determined in the step S730 of FIG. 7, the power coefficients of the power modes 843, 844, 845, and 846 in FIG. 8C may be calculated respectively to be 0, 2 (i.e. 18−16), 3, and 16 according to the step S740 in FIG. 7.

The embodiment of step S740 in FIG. 7 is not limited to the related description in the aforementioned embodiment. For example, a detailed embodiment of step S740 will be illustrated hereinafter according to another embodiment. The simulation platform may provide an execution probability of each of a plurality of operands in a power mode. According to the execution probability and the characteristics of each of the operands in the power mode, the simulation platform may calculate a power coefficient of the power mode. In the present embodiment, the execution probability includes the number of re-execution of a loop of an operand and the execution probability of the branches of the operand. In step S740 illustrated in FIG. 7, the simulation platform may also calculate the power coefficient of its power mode based on equation (1). In equation (1), Pval(Mode$_x$) represents the power coefficient of a power mode Mode$_x$; P(OP$_i$) represents the power consumption of an operand $OP_i$ in the power mode $Mode_x$; $T(OP_i)$ represents the length of the execution time of the operand $OP_i$; $L(OP_i)$ represents the number of re-execution of a loop of the operand $OP_i$; $B(OP_i)$ represents the execution probability of a branch of the operand $OP_i$.

$$Pval(Mode_x) = \frac{\sum_i (P(OP_i) \times T(OP_i) \times L(OP_i) \times B(OP_i))}{\sum_i (T(OP_i) \times L(OP_i) \times B(OP_i))} \quad \text{equation (1)}$$

Figure 10:
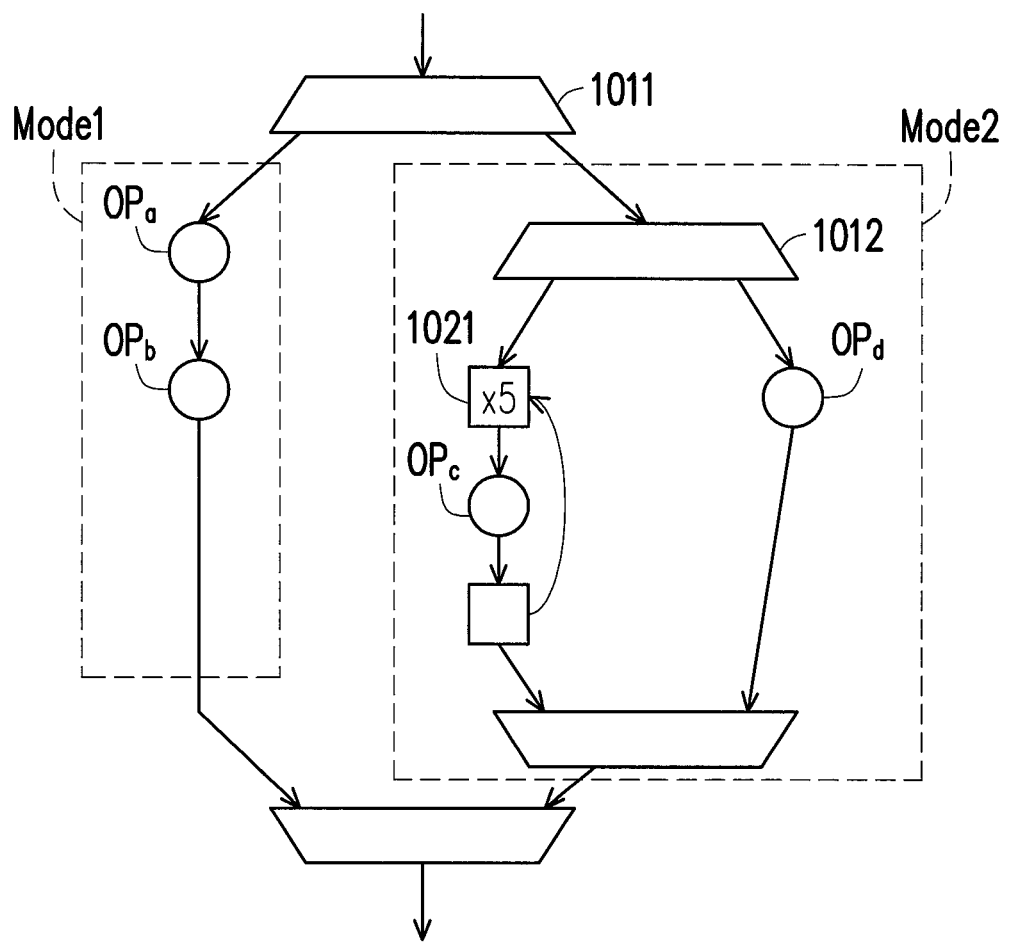
FIG. 10 is a schematic diagram of a CDFG of an electronic device according to another embodiment of the disclosure.

FIG. 10 is a schematic diagram of a CDFG of an electronic device according to another embodiment of the disclosure, wherein trapezoids represent branch points (e.g. the branch points 1011 and 1012), squares represent loops (e.g. the loop 1021), and hollow circles represent operands (e.g. the operands $OP_a$, $OP_b$, $OP_c$, and $OP_d$). The number within each of the squares represents the number of re-execution time of the loop. Additionally, assume that an execution probability of a left path of the branch point 1012 (i.e. the branch path including the loop 1021) is 0.6 and an execution probability of a right path of the branch point 1012 (i.e. the branch path including the operand $OP_d$) is 0.4. Since there exists no branches or loops in a power mode $Mode_1$, the number of re-execution of the loop is set to be 1 and the execution probability of the branch $B(OP_i)$ is set to be 1. By using equation (1), the simulation platform calculates the power coefficient of the power mode Mode1 in FIG. 10 to be $$Pval(Mode_1) = \frac{P(OP_a) \times T(OP_a) \times 1 \times 1 + P(OP_b) \times T(OP_b) \times 1 \times 1}{T(OP_a) \times 1 \times 1 + T(OP_b) \times 1 \times 1}.$$

By using equation (1), the simulation platform also may calculate the power coefficient of a power mode $Mode_2$ in FIG. 10 to be $$Pval(Mode_2) = \frac{P(OP_c) \times T(OP_c) \times 5 \times 0.6 + P(OP_d) \times T(OP_d) \times 1 \times 0.4}{T(OP_c) \times 5 \times 0.6 + T(OP_d) \times 1 \times 0.4}.$$

The embodiment of step S740 in FIG. 7 is not limited to the related description in the aforementioned embodiment. For example, in other embodiment, the electronic device of the target system may be synthesized by using a high-level synthesizer, and the high-level synthesizer may perform power characterization to the at least one power mode of the electronic device so as to obtain the at least one power coefficient of the at least one power mode.

Figure 11A:
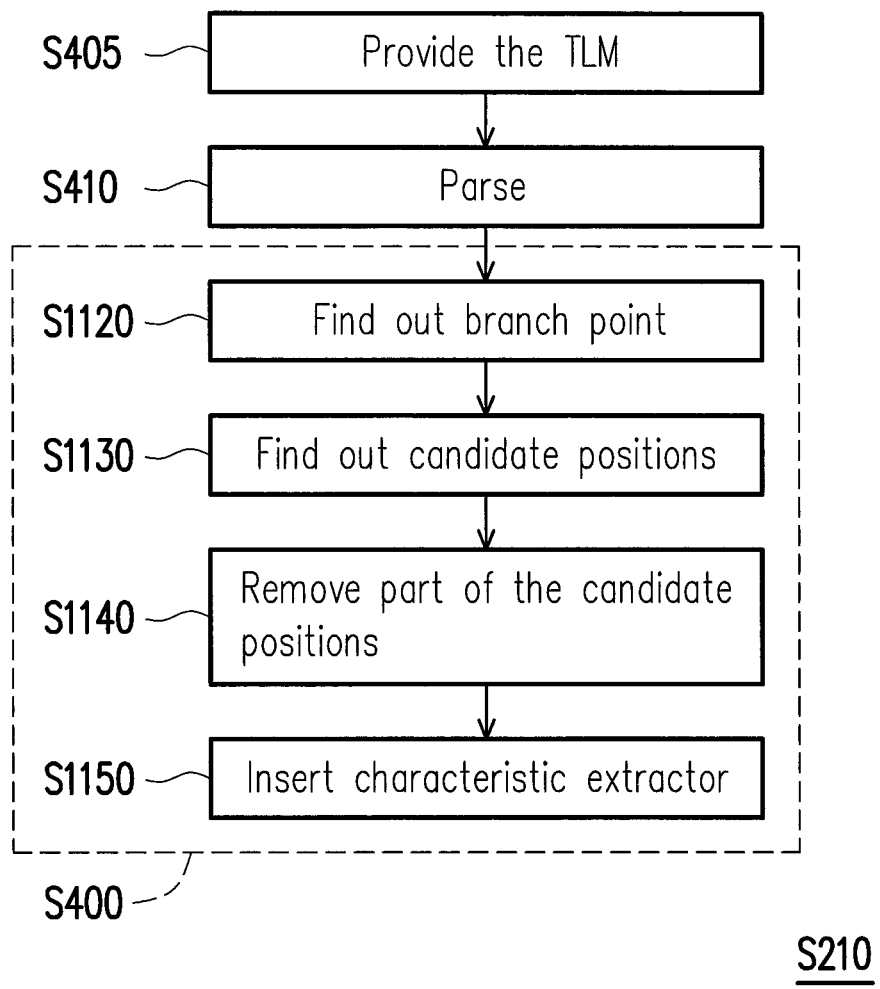
FIG. 11A is a schematic flow chart of a method for calculating a power coefficient and inserting the characteristic extractor according to another embodiment of the disclosure.

FIG. 11A is a schematic flow chart of a method for calculating a power coefficient and inserting the characteristic extractor 110 according to another embodiment of the disclosure. The method illustrated in FIG. 11A may be viewed as another embodiment in step S210 in FIG. 1. Steps S405, S410 and S400 in FIG. 11A may refer to the related descriptions of steps S405, S410 and S400 in FIG. 3, FIG. 5 and FIG. 7. In this embodiment, the step S400 of FIG. 11A includes steps S1120, S1130, S1140 and S1150. Step S1150 in FIG. 11A may refer to the related descriptions in step S430 of FIG. 5 and step S750 of FIG. 7.

In step S1120, the simulation platform may find out all branch points of the electronic device on the CDFG of the electronic device, wherein each of the branch points includes a plurality of branch paths. In step S1130, the simulation platform may find candidate positions from the beginning of the sequential operations which do not have a branch or loop, the beginning of each of the branch paths of each of the branch points and the beginning of each of the loops in the CDFG. In step S1140, the simulation platform may delete/remove/cluster a part of the candidate positions from all of the candidate positions found in step S1130 based on at least one removing countermeasures. After the step S1140 is completed, the simulation platform may determine target points based on the rest candidate positions and insert the characteristic extractors according to the target points in step S1150. In other embodiment, in step S1150, the simulation platform may determine the power mode (or operation status) of the electronic device based on the target points on the CDFG. The embodiment of determining the power mode may refer to the related descriptions in step S730 and S740 in FIG. 7.

The present embodiment is not limited to the removing countermeasure adopted in step S1140. In some embodiments, the removing countermeasure adopted in step 1140 may include perform clustering operation. For example, the simulation platform may perform clustering operation on all operands in the same branch path that has no any branch or loop in step S1140. The plurality of operands performed clustering operation may be viewed as an equivalent operand (defined as "a clustered operand" hereinafter) by the simulation platform. After obtaining the clustered operand, the simulation platform may remove/delete all of the candidate positions within the clustered operand in step S1140.

In other embodiments, the removing countermeasure adopted in step S1140 may include another clustering operation. For example, the simulation platform may perform clustering operation on the loops which do not have any branch or branches in step S1140 so that the loops performed clustering operation may be viewed as the clustered operands. After obtaining the clustered operands, the simulation platform may remove/delete all of the candidate positions within the clustered operands in step S1140.

In other embodiments, the removing countermeasure adopted in step S1140 may include another clustering operation. For example, in step S1140, the simulation platform may define a threshold, cumulate the power consumption of an operand in each branch path of each branch point respectively, and calculate the power consumption difference of each of the branch points. According to the power consumption differences, the simulation platform may perform clustering operation entirely on the branch paths of the branch points of which the power consumption differences are less than the threshold such that the entire branches performed clustering operation may be viewed as a clustered operand. After obtaining the clustered operands, the simulation platform may remove/delete all of the candidate positions within the clustered operands in step S1140. Detailed embodiments of cumulating the power consumption of the operands, calculating the power consumption differences of the branch points and performing clustering operation on the branches may refer to the related descriptions in step S720 in FIG. 7 and FIG. 8A~8C.

In other embodiments, the removing countermeasure adopted in step S1140 may include an adjustment of the threshold in the aforementioned clustering operation. For example, in step S1140, the simulation platform may define a number value and find out the number of the rest candidate positions after the aforementioned deleting operation is performed on the candidate positions. If the number of the rest candidate positions is greater than the number value, the threshold in the aforementioned clustering operation is increased and the clustering operation is performed again by using the adjusted threshold until the number of the rest candidate positions is not greater than the number value.

In other embodiments, the removing countermeasure adopted in step S1140 may include other types of clustering operation. For example, in step S1140, the simulation platform may define a threshold and calculate a power consumption partial difference of each branch. The so-called "power consumption partial difference" refers to the power consumption difference between power consumptions of first operands (clustered operands) in each branch path of the same branch point. Based on the power consumption partial differences, the simulation platform may perform clustering operation on the candidate positions in the branch paths of a branch point with the power consumption partial difference less than the threshold. The aforementioned performing clustering operation on the candidate positions refers to removing/deleting the candidate positions which are after the branch point and adding a candidate position before the branch point.

Figure 11B:
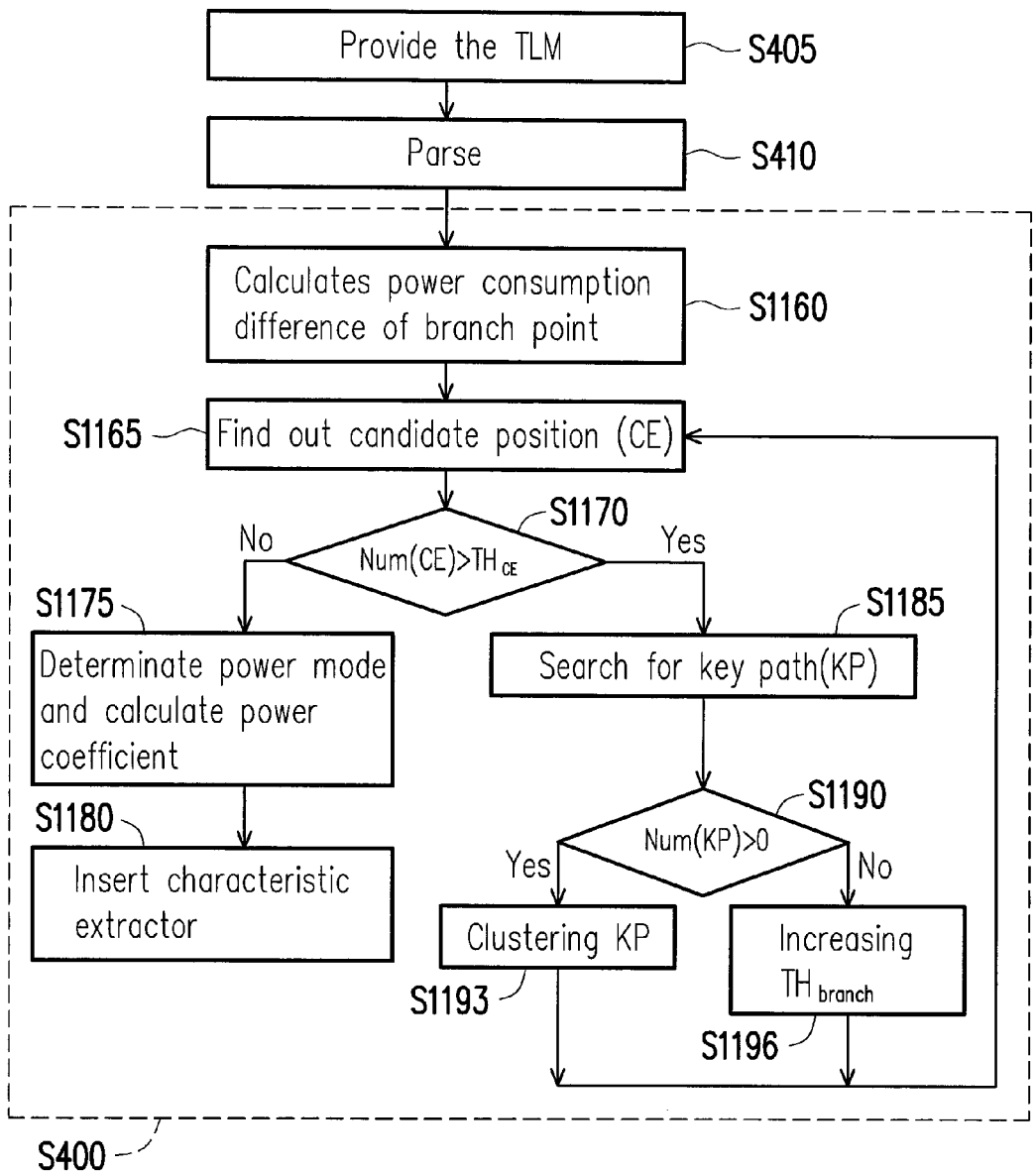
FIG. 11B is a schematic flow chart of a method for calculating a power coefficient and inserting the characteristic extractor according to further another embodiment of the disclosure.

FIG. 11B is a schematic flow chart of a method for calculating a power coefficient and inserting the characteristic extractor 110 according to further another embodiment of the disclosure. The method illustrated in FIG. 11B may be viewed as other embodiment in step S210 in FIG. 1. Steps S405, S410 and S400 in FIG. 11B may refer to the related descriptions of steps S405, S410 and S400 in FIG. 3, FIG. 5, FIG. 7 and FIG. 11A. In this embodiment, the step S400 of FIG. 11B includes steps S1160, S1165, S1170, S1175, S1180, S1185, S1190, S1193 and S1196.

Step S1160 of FIG. 11B may refer to the related descriptions in step S710 of FIG. 7. After the step S1160, the simulation platform may perform step S1165 so as to find candidate positions CE from the beginning of the sequential operations which do not have a branch or loop, the beginning of each of the branch paths of each of the branch points and the beginning of each of the loops on the CDFG of the electronic device. In step S1170, the simulation platform may determine whether the number of the candidate positions CE (denoted as Num(CE) in step S1170 in FIG. 11B) is greater than a number value $TH_{CE}$. The number value $TH_{CE}$ may be set to any value according to design requirement or constraint.

When the number of the candidate positions is not greater than the number value $TH_{CE}$, the simulation platform may determine the target point in the CDFG according to the candidate position found by the step S1165, and perform step S1175 to determine at least one power mode in the CDFG according to the target point. Step S1175 of FIG. 11B may refer to the related descriptions in steps S730 and S740 of FIG. 7. After the step S1175, the simulation platform may insert the characteristic extractors according to the target point in the step S1180. Step S1180 of FIG. 11B may refer to the related descriptions in step S430 of FIG. 5, step S750 of FIG. 7 or step S1295 of FIG. 12.

When the number of the candidate positions is greater than the number value $TH_{CE}$, the simulation platform may perform the step S1185 for finding out "key path" KP. The key path KP include "sequential operand", "simple loop", branch point with the "power consumption differences" (defined as "PAD" hereinafter) smaller than the threshold $TH_{branch}$, and/or branch point with the "power consumption partial difference" (defined as "PAPD" hereinafter) less than the threshold $TH_{branch}$. The sequential operand is that no branch or loop within the operands. The simple loop is that does not have branch within a loop. In step S1190, the simulation platform may determine whether the number of the key path KP (denoted as Num(KP) in step S1190 in FIG. 11B) is greater than 0.

When the number of the key path KP is greater than 0, the simulation platform may perform the step S1193 for clustering key path KP. If the key path KP includes the sequential operands, the simulation platform may perform clustering operation on the sequential operands. The sequential operands performed clustering operation may be viewed as an equivalent operand (defined as "a clustered operand" hereinafter) by the simulation platform. After obtaining the clustered operand, the simulation platform may remove/delete all of the candidate positions within the clustered operand in the step S1193.

If the key path KP includes the simple loop, the simulation platform may perform clustering operation on the simple loop. For example, the simulation platform may perform clustering operation on the simple loop which does not have any branch or branches in step S1193 so that the simple loop performed clustering operation may be viewed as the clustered operands. After obtaining the clustered operand, the simulation platform may remove/delete all of the candidate positions within the clustered operand in the step S1193.

If the key path KP includes the branch point with the PAD smaller than the threshold $TH_{branch}$, the simulation platform may perform clustering operation on the branch point. For example, in step S1160, the simulation platform may define the threshold $TH_{branch}$, cumulate the power consumption of an operand in each branch path of each branch point respectively, and calculate the PAD of each of the branch points. According to the PAD, the simulation platform may perform clustering operation entirely on the branch paths of the branch points of which the PAD are less than the threshold $TH_{branch}$ in the step S1193, such that the entire branches performed clustering operation may be viewed as a clustered operand. After obtaining the clustered operand, the simulation platform may remove/delete all of the candidate positions within the clustered operand in the step S1193.

If the key path KP includes the branch point with the PAPD less than the threshold $TH_{branch}$, the simulation platform may perform clustering operation on the branch point. For example, in the step S1160, the simulation platform may define a threshold $TH_{branch}$ and calculates the PAPD of each branch. The so-called PAPD refers to the PAD between power consumptions of first operands (clustered operands) in each branch path of the same branch point. Based on the PAPD, the simulation platform may perform clustering operation on the candidate positions in the branch paths of a branch point with the PAPD less than the threshold $TH_{branch}$. The aforementioned performing clustering operation on the candidate positions refers to removing/deleting the candidate positions which are after the branch point, and adding a candidate position before the branch point in the step S1193.

When the number of the key path KP is not greater than 0 in the step S1190, the simulation platform may perform the step S1196 for increased the threshold $TH_{branch}$. When the step S1196 is completed, the simulation platform may perform the step S1165 again to re-search candidate positions CE after clustered.

Figure 12:
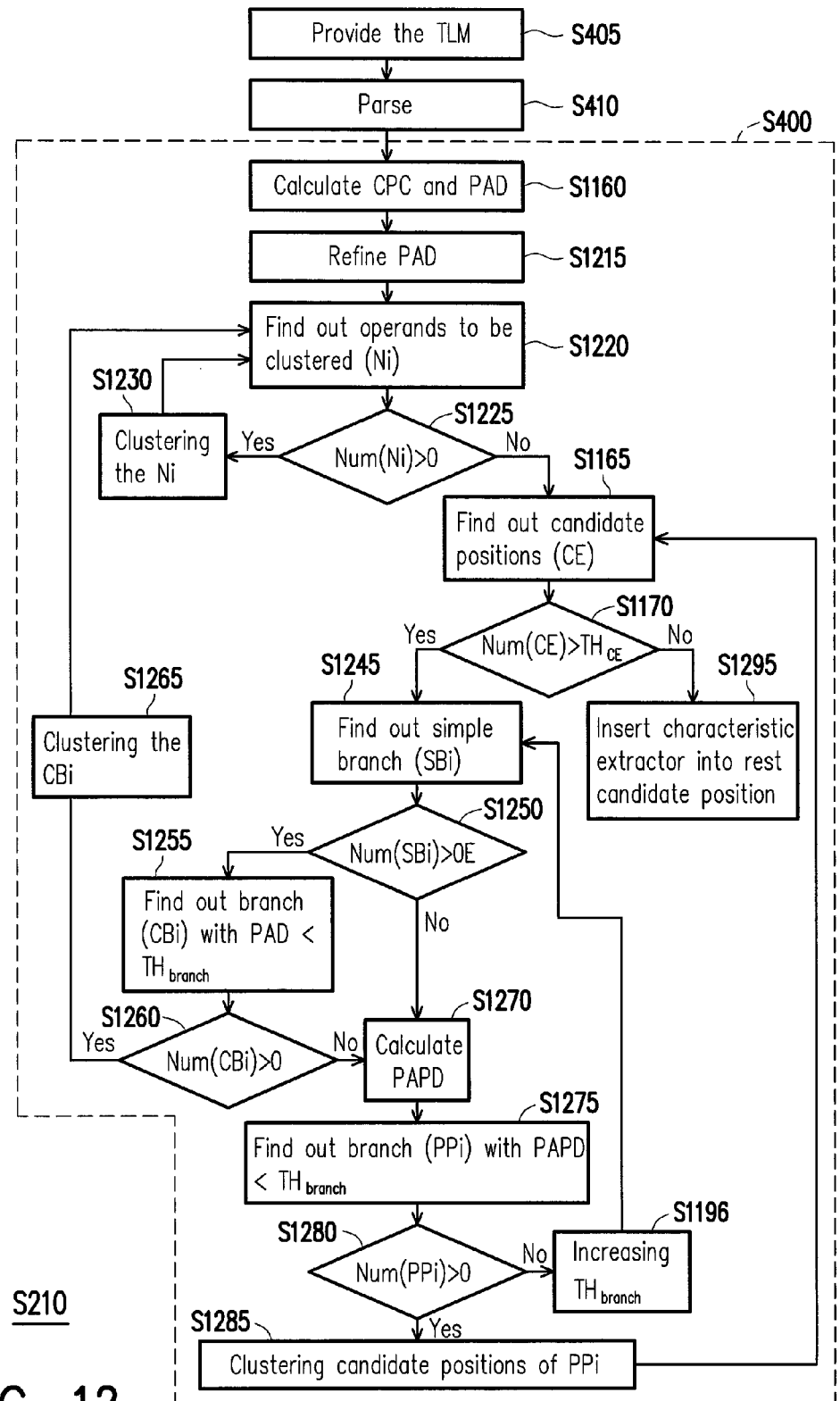
FIG. 12 is a schematic flow chart of a method of calculating a power coefficient and inserting the characteristic extractor according to another embodiment of the disclosure.

FIG. 12 is a schematic flow chart of a method for calculating a power coefficient and inserting the characteristic extractor 110 according to other embodiment of the disclosure. The method illustrated in FIG. 12 may be another embodiment of step S210 of FIG. 1. Steps S405, S410 and S400 of FIG. 12 may refer to the related descriptions of steps S405, S410 and S400 of FIG. 3, FIG. 5, FIG. 7 or FIG. 11B. The simulation platform performs step S410 to allow the TLM of the electronic device of the target system to proceed the source level parsing to obtain a CDFG of the electronic device (e.g. as illustrated in FIG. 8A). In this embodiment, the step S400 of FIG. 12 includes steps S1160, S1165, S1170, S1196, S1215, S1220, S1225, S1230, S1245, S1250, S1255, S1260, S1265, S1270, S1275, S1280, S1285 and S1295.

Referring to FIG. 8A and FIG. 12, in step S410, the simulation platform may find out all branch points on the CDFG of the electronic device. In step S1160, the simulation may cumulate the power consumption of an operand in each branch path of each branch and obtain cumulated power consumption values CPC of different operands. The number within each of the circles in FIG. 8A represents the cumulated power consumption value CPC of the operand. After the aforementioned cumulating operations on the power consumption are completed, in step S1160, the simulation platform may calculate a power consumption difference PAD of each of the branches respectively. Details on calculating the cumulated power consumption values CPC and the power consumption differences PAD may refer to the related description in step S710 in FIG. 7. In the present embodiment, the power consumption difference PAD of the branch point 811 is 18; the power consumption difference PAD of the branch point 812 is 0; the power consumption difference PAD of the branch point 813 is 13; the power consumption difference PAD of the branch point 814 is 1.

In step S1215, the simulation platform may refine the power consumption difference PAD. For example, the power consumption difference PAD of the branch point 814 is 1. Since the loop 822 re-executes the branch 814 five times, the simulation platform may refine the power consumption difference PAD of the branch point 814 to be 1×5=5 in step S1215. After the refining process is completed, in step S1220, the simulation platform may find out operands Ni which are able to be clustered. The simulation platform may find out all consecutive operands in the same branch path or sequential operations which do not have branch or loop to serve as the operands Ni to be clustered in the CDFG of FIG. 8A. For example, three branch paths of the branch point 812 are three different operands Ni to be clustered respectively, and the operands 831 and 832 are other operands Ni to be clustered. Additionally, the simulation platform may find out loop or loops that do not have branch or branches on the CDFG in FIG. 8A and view the loops with no branch or branches as the operand Ni. For example, in overall, the loop 821 is another the operand Ni to be clustered. Hence, the number of the operands Ni to be clustered (denoted as Num(Ni) in step S1225 in FIG. 12) in FIG. 8A is 5.

The simulation platform performs steps S1225 and S1230 five times until Num(Ni)=0. Whenever step S1230 is performed, the simulation platform may select one of the operands to be clustered to perform clustering operation. For example, the simulation platform may select the consecutive operands 831 and 832 to perform clustering operation and view the consecutive operands 831 and 832 as an equivalent operand (defined as a clustered operand). For example, the simulation platform may perform clustering operation on the loop 821 entirely such that the loop 821 is viewed as a clustered operand in overall.

Figure 13A:
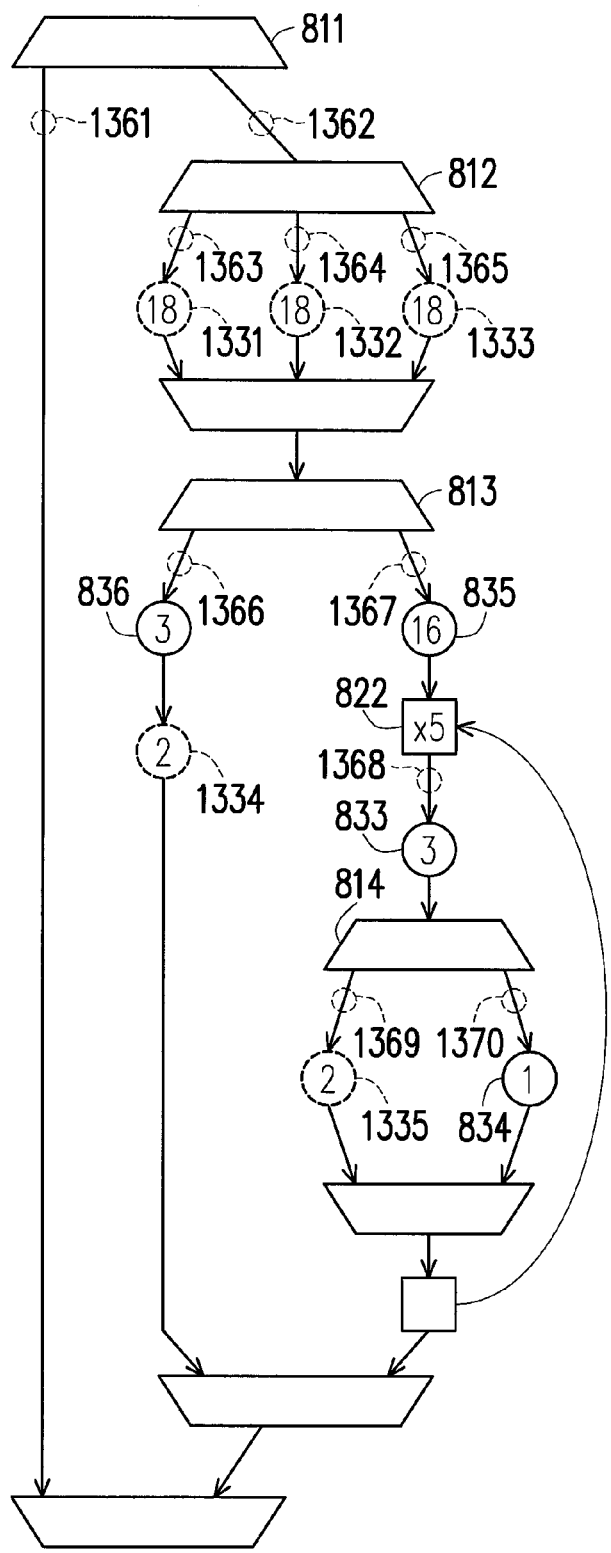
FIG. 13A to FIG. 13D is a schematic diagram of an operating procedure of the flow illustrated in FIG. 12 according to the CDFG in FIG. 8A in another embodiment of the disclosure.

FIG. 13A to FIG. 13D is a schematic diagram of an operating procedure of the flow illustrated in FIG. 12 according to the CDFG in FIG. 8A in another embodiment of the disclosure. In FIG. 13A, clustered operands 1331, 1332, and 1333 are clustering operation results of three branch paths of the branch points 812. An operand 1334 in FIG. 13A is an overall clustering operation result of the loop 821 in FIG. 8A; an operand 1335 in FIG. 13A is an overall clustering operation result of the consecutive operands 831 and 832 in FIG. 8A. From FIG. 13A, after the operand 1334 is obtained, an operand 836 and the clustered operand 1334 form a new group of consecutive operands (i.e. the operand Ni to be clustered). Hence, the simulation platform perform steps S1225 and S1230 again so as to cluster the consecutive operands 836 and 1334 to another clustered operand (such as the clustered operand 1336 in FIG. 13B).

When it is determined that Num(Ni)=0 in step S1225, the simulation platform may perform step S1165 so as to find candidate positions CE (such as the positions denoted as 1361~1370 in FIG. 13A) from the beginning of the sequential operations which do not have any branch or loop, the beginning of each of the branch paths of each of the branch points and the beginning of each of the loops on the CDFG in FIG. 13A. Step S1165 may refer to the related description in step S1130 of FIG. 11A and step S1165 of FIG. 11B. In step S1170 of FIG. 12, the simulation platform may determine whether the number of the candidate positions CE (denoted as Num (CE) in step S1170 in FIG. 12) is greater than a number value $TH_{CE}$. In the present embodiment, the number value $TH_{CE}$ may be set to, for example, 3. Since the number of the candidate positions CE is 10 (greater than the number value $TH_{CE}$) in FIG. 13A, the simulation platform may thus perform step S1245.

In step S1245, the simulation platform may find simple branches SBi on the CDFG illustrated in FIG. 13A. The so-called "simple branch" refers that each branch path of a branch point has only one candidate position CE. From FIG. 13A, an entire branch including the branch point 812 is a simple branch SBi, and an entire branch including the branch point 814 is another simple branch SBi. In step S1250, the simulation platform may determine whether the number of the simple branches SBi (denoted as Num(SBi) in step S1250 in FIG. 12) is greater than 0. Since the number of the simple branches SBi in FIG. 13A is 2, the simulation platform may thus perform step S1255.

In step S1255, the simulation platform may find branches CBi such that the power consumption differences PAD thereof are less than the threshold $TH_{branch}$ from the simple branches SBi. In the present embodiment, the threshold $TH_{branch}$ may be set to, for example, 4. Since the power consumption difference PAD of the branch point 812 is 0 and the power consumption difference PAD of the branch point 814 is 5, the entire branch including the branch point 812 is a branch CBi. In step S1260, the simulation platform may determine whether the number of the branches CBi (denoted as Num(CBi) in step S1260 in FIG. 12) is greater than 0. Since the number of the branches CBi is 1 in FIG. 13A, the simulation platform will thus perform step S1265. In step S1265, the simulation platform may perform clustering operation entirely on the branch of the branch point 812 such that the power consumption differences PAD thereof are less than the threshold $TH_{branch}$, and the entire branch including the branch point 812 is viewed as a clustered operand.

Figure 13B:
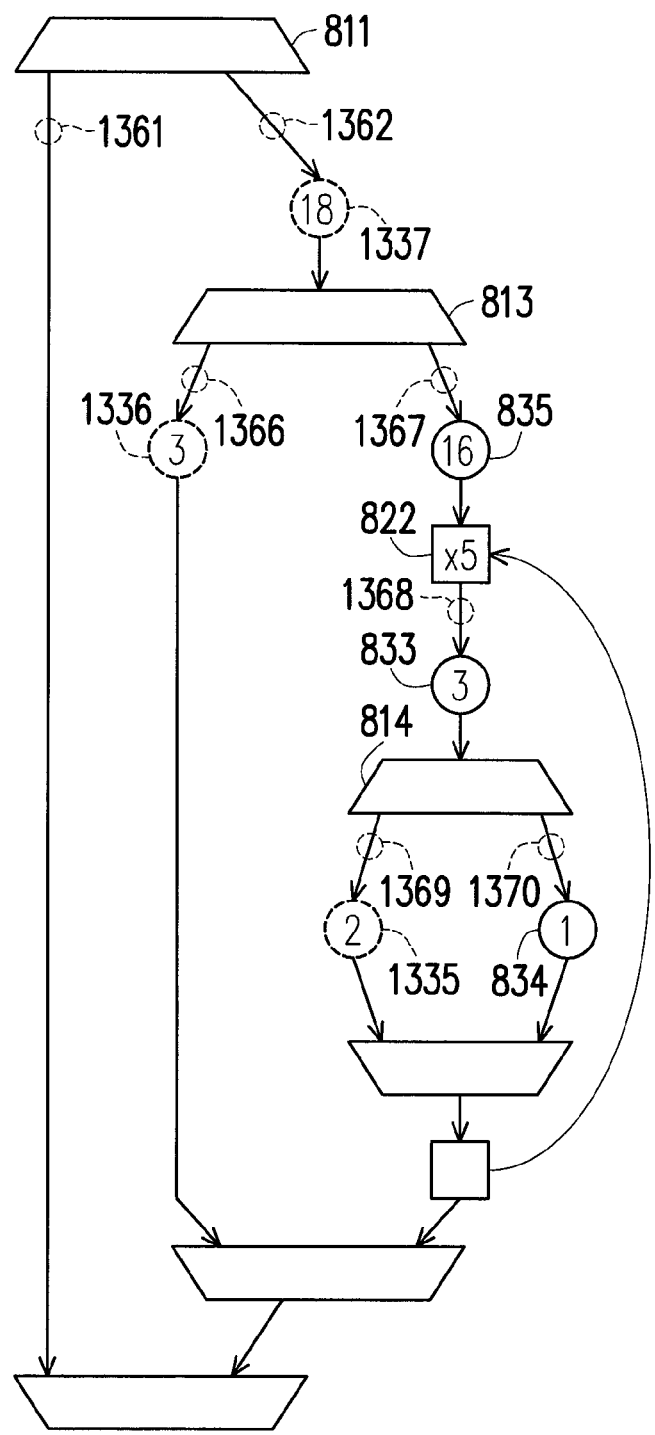

A clustered operand 1336 in FIG. 13B is a clustering operation result of consecutive operands 836 and 1334 in FIG. 13A, and a clustered operand 1337 in FIG. 13B is a clustering operation result of the entire branch including the branch point 812 in FIG. 13A. Original candidate positions CE within the clustered operand 1337 (denoted as 1363, 1364, and 1365 in FIG. 13A) may be deleted/removed. Since the power consumption difference PAD of the branch point 814 (the value is 5) is greater than the threshold $TH_{branch}$ (the value is 4), the branches including the branch point 814 will not be performed clustering operation.

After step S1265 is completed, the simulation platform may perform step S1220 again so as to find out operands Ni to be clustered. Meanwhile, as illustrated in FIG. 13B, the number of the operands Ni to be clustered is 0. Therefore, the simulation platform may perform step S1165 again so as to find candidate positions CE. Meanwhile, as illustrated in FIG. 13B, the number of the candidate positions CE is 7 (the value is 3, which is greater than the number value $TH_{CE}$, in the present embodiment). Thus, the simulation platform may perform step S1245 again so as to find simple branches SBi. Meanwhile, as illustrated in FIG. 13B, the number of the simple branches is 1 (i.e. the entire branch including the branch point 814). Thus, the simulation platform may perform step S1255 again so as to find branches CBi such that the power consumption difference PAD thereof is less than the threshold $TH_{branch}$ from the simple branches SBi. Meanwhile, the power consumption difference PAD of the branch point 814 in FIG. 13B is 5 and the threshold $TH_{branch}$ is 4, and therefore the number of the branches CBi is 0. Thus, the simulation platform may perform step S1270.

In step S1270, the simulation platform may calculate a power consumption partial difference PAPD of each branch point respectively. The so-called "power consumption partial difference" refers to a difference between power consumptions of first operands (clustered operands) in each branch path of the same branch point. For example, the power consumption of a left branch path of the branch point 811 is 0, and the power consumption of the first operand (i.e. the clustered operand 1337) of a right branch path of the branch point 811 is 2. The power consumption of the clustered operand 1337 may be obtained by the cumulated power consumption value CPC (i.e. 18) of the clustered operand 1337 subtracted by the cumulated power consumption value CPC (i.e. 16) of the next operand (i.e. the operand 835). Therefore, the power consumption partial difference PAPD of the branch point 811 in FIG. 13B is 2−0=2. In a similar fashion, the power consumption partial difference PAPD of the branch point 813 in FIG. 13B is 3−(16−15)=2, and the power consumption partial difference PAPD of the branch point 814 is (2−1)×5=5.

After step S1270 is completed, the simulation platform may perform step S1275 so as to find branch points such that the power consumption partial difference PAPD thereof is less than the threshold $TH_{branch}$ to be branches PPi from all of the branch points. For example, the power consumption partial difference PAPD of the branch point 811 in FIG. 13B is 2 and the threshold $TH_{branch}$ herein is set to 4, and therefore the branch point 811 is a branch PPi. In a similar fashion, the power consumption partial difference PAPD of the branch point 813 in FIG. 13B is 2, and therefore the branch point 813 is another branch PPi. The power consumption partial difference PAPD of the branch point 814 is 5, and therefore the branch point 814 is not a branch PPi. Hence, the number of the branches PPi in FIG. 13B (denoted as Num(PPi) in step S1280 in FIG. 12) is 2. Since the number of the branches PPi is 2 in FIG. 13B, the simulation platform may then perform step S1285.

Figure 13C:
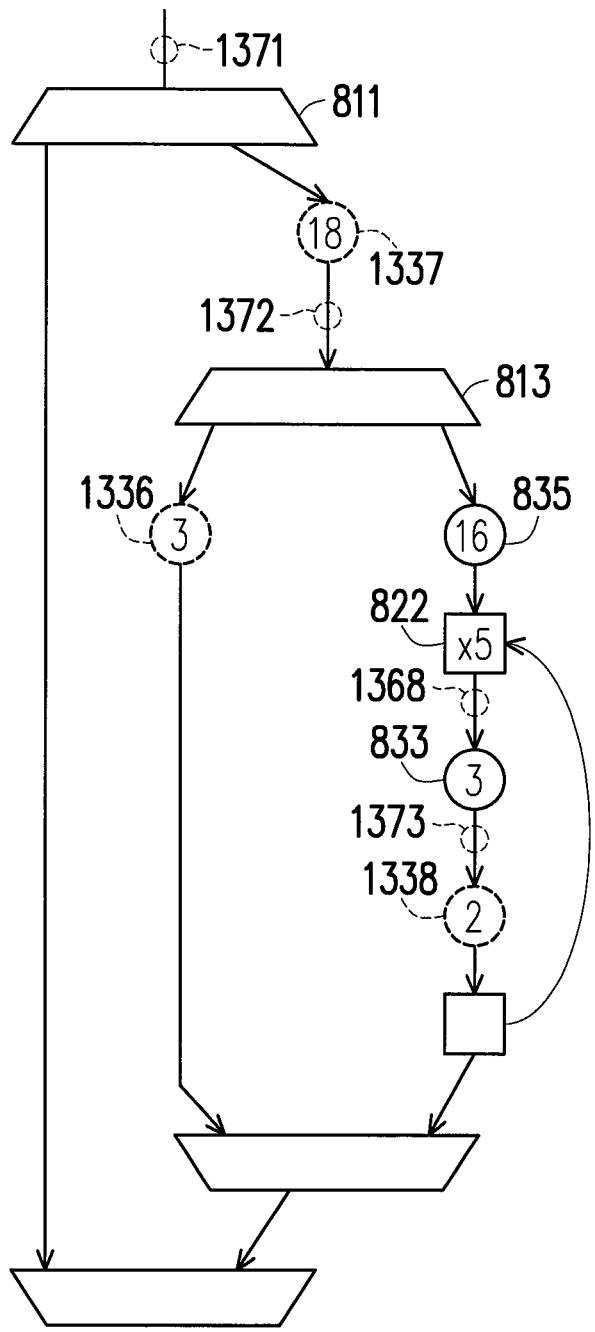

In step S1285, the simulation platform may perform clustering operation on the candidate positions of the branches (i.e. the branch PPi) such that the power consumption partial differences thereof are less than the threshold. The performing clustering operation on the candidate positions herein refers to removing/deleting the candidate positions which are after the branch point and adding a new candidate position before the branch point. For example, after the clustering operation is completed, the candidate positions 1361 and 1362 which are after the branch point 811 in FIG. 13B may be removed/deleted and a new candidate position 1371 may be added before the branch point 811 (as illustrated in FIG. 13C). In a similar fashion, the candidate positions 1366 and 1367 which are after the branch point 813 in FIG. 13B may be removed/deleted, and a new candidate position 1372 may be added before the branch point 813 (as illustrated in FIG. 13C).

After step S1285 is completed, the simulation platform may perform step S1165 again so as to find candidate positions CE. Meanwhile, the candidate positions 1361, 1362, 1366, and 1367 in FIG. 13B are clustered, and therefore the number of the candidate positions is 5, that is, the candidate positions 1371, 1372, 1368, 1369, and 1370. Since the number of the candidate positions CE is greater than a number value $TH_{CE}$ (the value is 3 in the present embodiment), the simulation platform may perform step S1245 again so as to find simple branches SBi. Meanwhile, as illustrated in FIG. 13B, the number of the simple branches SBi is 1 (i.e. the entire branch including the branch point 814). Hence, the simulation platform may perform step S1255 again so as to find branches CBi such that the power consumption differences PAD thereof are less than the threshold $TH_{branch}$ from the simple branches SBi. Meanwhile, the number of the branches SBi in FIG. 13B is 0, and therefore the simulation platform may perform steps S1270 and step 1275 again. In step S1275, the simulation platform may find branches PPi. Since the branch point 811 and the branch point 813 in FIG. 13B are clustered and the power consumption partial difference PAPD of the branch point 814 is greater than the threshold $TH_{branch}$, the number of the branch PPi is 0. Since the number of the branches PPi in FIG. 13B is 0, the simulation platform may thus perform step S1196.

In step S1196, the simulation may adjust the threshold $TH_{branch}$ in the aforementioned clustering operation. For example, the simulation platform may adjust the threshold $TH_{branch}$ from its original value 4 to 5. After step S1196 is completed, the simulation platform may perform step S1245 again so as to find simple branches SBi. Meanwhile, as illustrated in FIG. 13B, the number of the simple branches SBi is 1 (i.e. the entire branch including the branch point 814). Thus, the simulation platform may perform step S1255 again so as to find branches CBi such that the power consumption differences PAD thereof are less than the threshold $TH_{branch}$ from the simple branches SBi. Meanwhile, the power consumption difference PAD of the branch point 814 in FIG. 13B is 5 and the threshold $TH_{branch}$ is 5, and therefore the number of the branch CBi is 1. Hence, the simulation platform may perform step S1265 again. In step S1265, the simulation platform may perform clustering operation on the branch CBi (i.e. the entire branch of the branch point 814 in FIG. 13B).

A clustered operand 1338 in FIG. 13C is a clustering operation result of branches of the branch point 814 illustrated in FIG. 13B. Original candidate positions CE of the clustered operand 1338 (i.e. denoted as 1369 and 1370 in FIG. 13B) may be deleted/removed, and a new candidate position 1373 may be added before the clustered operand 1338. After step S1265 is completed, the simulation platform may perform step S1220 again so as to find operands Ni to be clustered. Meanwhile, as illustrated in FIG. 13C, the number of the operands Ni to be clustered is 1 (i.e. the loop 822 has no branch). Therefore, the simulation platform may perform step S1230 again and perform clustering operation on the loop 822, which is viewed as a clustered operand 1339 (as illustrated in FIG. 13D).

Figure 13D:
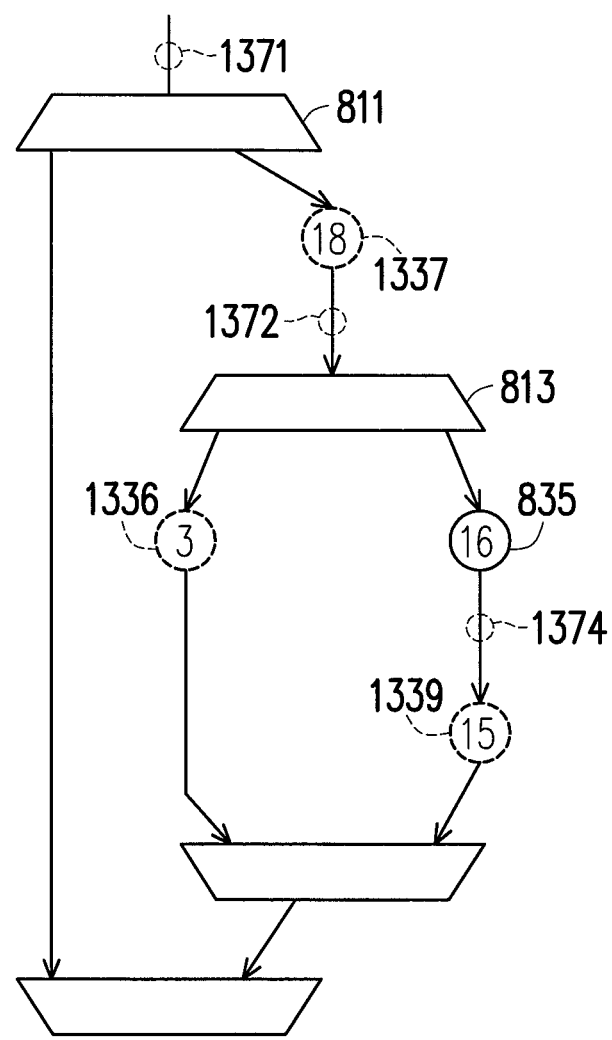

The clustered operand 1339 in FIG. 13D is a clustering operation result of the loop 822 in FIG. 8C in overall. Original candidate positions CE within the clustered operand 1339 (i.e. denoted as 1368 and 1373 in FIG. 13C) may be deleted/removed and a new candidate position 1374 may be added before the clustered operand 1339 (as illustrated in FIG. 13D). After steps S1220~S1230 are completed, the simulation platform may perform step S1165 again so as to find candidate positions CE. Meanwhile, as illustrated in FIG. 13D, the number of the candidate positions is 3 (i.e. the candidate positions 1371, 1372, and 1374). Since the number of the candidate positions determined in step S1170 is not greater than the number value $TH_{CE}$ (e.g. 3), the simulation platform may perform step S1295 so as to insert the characteristic extractors into the rest of the candidate positions 1371, 1372, and 1374. Step S1295 illustrated in FIG. 12 may refer to the related descriptions in step S430 of FIG. 5, step S750 of FIG. 7, step S1150 of FIG. 11A and steps S115 and S1180 of FIG. 11B.

The above embodiments may be realized by hardware. Those skilled in the art may realize the above embodiments in the form of the computer program with reference to the illustration of the embodiments and uses the non-transitory computer readable storage medium to store the computer program, for facilitating the computer to execute the characteristic extractor 110 inserting method and execute the system power estimation method of the above embodiments. Or, some components of the above embodiments are realized by hardware and other components are realized by software. The hardware and the software collaboratively operate to realize the system power estimation method.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for inserting characteristic extractor, comprising:
   parsing, using a computer, a transaction level model (TLM) of an electronic device of a target system to find out a plurality of branch points of the electronic device, wherein each of the branch points has a plurality of branch paths;
   finding out at least one target point of an operation status of the electronic device according to the branch points; and
   inserting, using the computer, at least one characteristic extractor according to the at least one target point.

2. The method according to claim 1, wherein the step of finding out the at least one target point of the electronic device comprises:
   parsing the TLM of the electronic device to obtain a control data flow graph (CDFG) of the electronic device;
   finding out the branch points of the electronic device from the CDFG;
   calculating an operand amount of each of the branch paths of each of the branch points;
   calculating an operand amount difference of each of the branch points; and
   selecting the at least one target point from the branch points based on the operand amount difference;
   wherein the step of inserting at least one characteristic extractor inserts the at least one characteristic extractor into branch path of the at least one target point.

3. The method according to claim 2, wherein the step of selecting at least one target point comprises:
   selecting a branch point with a most operand amount difference from the branch points to serve as the at least one target point.

4. The method according to claim 2, wherein the step of selecting at least one target point comprises:
   defining a threshold; and
   selecting a branch point with the operand amount difference greater than the threshold from the branch points to serve as the at least one target point.

5. The method according to claim 1, wherein the step of finding out the at least one target point of the electronic device comprises:
   parsing the TLM of the electronic device to obtain a control data flow graph (CDFG) of the electronic device;
   finding out the branch points of the electronic device from the CDFG;
   cumulating a power consumption of operand in each of the branch paths of each of the branch points, respectively; and
   calculating a power consumption difference of each of the branch points;
   finding out the at least one target point of the electronic device from the CDFG according to the power consumption difference;
   determining at least one power mode of the electronic device from the CDFG according to the at least one target point; and
   calculating at least one power coefficient of the at least one power mode.

6. The method according to claim 5, wherein the step of finding out the at least one target point comprises:
   selecting a branch point with a most power consumption difference from the branch points to serve as the at least one target point.

7. The method according to claim 5, wherein the step of finding out the at least one target point comprises:
   defining a threshold; and
   selecting a branch point with the power consumption difference greater than the threshold from the branch points to serve as the at least one target point.

8. The method according to claim 5, wherein the step of determining at least one power mode comprises:
   finding out at least one candidate position on a beginning of a sequential operations which do not have a branch or loop, a beginning of each of the branch paths of each of the branch points and a beginning of each loop in the CDFG except the target point;
   removing the candidate position which is after the target point in the CDFG;
   clustering the candidate positions which are on a simple branch or a simple loop, wherein the simple branch is that each of the branch paths of a branch point has only one candidate position, and the simple loop is that no branch within a loop;
   removing the candidate position which is between sequential operands in the CDFG; and
   determining the at least one power mode in the CDFG according to remaining of the candidate position(s) after removing and clustering.

9. The method according to claim 8, wherein the step of determining at least one power mode further comprises:
   inserting at least one characteristic extractor at the position of the remaining of the candidate position(s).

10. The method according to claim 5, wherein the step of calculating the at least one power coefficient comprises:
    providing execution probability of each of a plurality of operands in the at least one power mode; and
    calculating the at least one power coefficient of the at least one power mode according to the execution probability of each of the operands in the at least one power mode and characteristic of each of the operands in the at least one power mode.

11. The method according to claim 10, wherein the execution probability comprises re-execution times of a loop including a corresponding operand of the operands and execution probability of branch including the corresponding operand, and the step of calculating the at least one power coefficient comprises:
calculating $$Pval(Mode_x) = \frac{\sum_i (P(OP_i) \times T(OP_i) \times L(OP_i) \times B(OP_i))}{\sum_i (T(OP_i) \times L(OP_i) \times B(OP_i))},$$

wherein the $Pval(Mode_x)$ is the at least one power coefficient of the at least one power mode $Mode_x$, $P(OP_i)$ is power of a operand $OP_i$ of the operands in the at least one power mode, $T(OP_i)$ is execution time of the operand $OP_i$, $L(OP_i)$ is the re-execution times of the loop including the operand $OP_i$, and $B(OP_i)$ is the execution probability of the branch including the operand $OP_i$.

12. The method according to claim 5, wherein the step of calculating the at least one power coefficient comprises:
synthesizing the electronic device of the target system by using a high-level synthesizer; and
performing power characterization to the at least one power mode by using the high-level synthesizer, so as to obtain the at least one power coefficient of the at least one power mode.

13. The method according to claim 1, wherein the step of finding out the at least one target point of the electronic device comprises:
parsing the TLM of the electronic device to obtain a control data flow graph (CDFG) of the electronic device;
finding out the branch points of the electronic device from the CDFG;
finding out a plurality of candidate positions on a beginning of sequential operations which do not have branch or loop, a beginning of each of the branch paths of each of the branch points and a beginning of each of the loops in the CDFG;
removing a part of the candidate positions according to at least one removing countermeasure; and
determining the at least one target point according to remaining of the candidate position(s) after removing.

14. The method according to claim 13, further comprising:
determining at least one power mode in the CDFG according to the at least one target point.

15. The method according to claim 13, wherein the at least one removing countermeasure comprises:
clustering consecutive operands in a same branch path or sequential operations which do not have branch or loop, to obtain a clustered operand; and
removing the candidate positions in the clustered operand.

16. The method according to claim 13, wherein the at least one removing countermeasure comprises:
clustering the loop which does not have branch within the same loop, to obtain a clustered operand; and
removing the candidate positions in the clustered operand.

17. The method according to claim 13, wherein the at least one removing countermeasure comprises:
defining a threshold;
cumulating a power consumption of operand in each of the branch paths of each of the branch points, respectively;
calculating a power consumption difference of each of the branch points;
clustering the branch having a branch point with the power consumption difference smaller than the threshold, to obtain a clustered operand; and
removing the candidate positions in the clustered operand.

18. The method according to claim 13, wherein the at least one removing countermeasure comprises:
defining a number value;
finding out number of the remaining of the candidate position(s) after removing;
increasing the threshold if the number of remaining of the candidate position(s) greater than the number value; and
performing the step of clustering the branch again after increasing the threshold.

19. The method according to claim 13, wherein the at least one removing countermeasure comprises:
defining a threshold;
calculating a power consumption partial difference of each of the branch points, wherein the power consumption partial difference is a difference between power consumptions of first operands/clustered operands in each of the branch paths of the branch point; and
clustering the candidate positions in the branch paths of a branch point with the power consumption partial difference smaller than the threshold.

20. A non-transitory computer readable recording medium, for storing a program that executes the method for inserting characteristic extractor according to claim 1.

* * * * *